(12) United States Patent
Morningstar

(10) Patent No.: US 7,714,737 B1
(45) Date of Patent: May 11, 2010

(54) WARNING SYSTEM FOR CHILD LEFT UNATTENDED IN VEHICLE

(76) Inventor: James Morningstar, 3661 Victoria Dr., West Palm Beach, FL (US) 33406

( * ) Notice: Subject to any disclaimer, the term of this patent is extended or adjusted under 35 U.S.C. 154(b) by 251 days.

(21) Appl. No.: 11/835,546

(22) Filed: Aug. 8, 2007

Related U.S. Application Data

(60) Provisional application No. 60/838,218, filed on Aug. 17, 2006.

(51) Int. Cl.
G08B 21/00 (2006.01)

(52) U.S. Cl. .................... 340/667; 340/552; 340/457.1; 340/425.5; 340/309.16; 340/438; 340/439; 180/271; 180/272; 180/374

(58) Field of Classification Search ................ 340/667, 340/522, 457.1, 425.5, 309.16, 438, 439; 180/271, 272, 734, 374
See application file for complete search history.

(56) References Cited

U.S. PATENT DOCUMENTS

| | | |
|---|---|---|
| 3,836,955 A | 9/1974 | Cracraft et al. |
| 4,429,916 A | 2/1984 | Hyde et al. |
| 4,790,593 A | 12/1988 | Davalos et al. |
| 4,796,013 A | 1/1989 | Yasuda et al. |
| 4,849,733 A | 7/1989 | Conigliaro et al. |
| 4,979,777 A | 12/1990 | Takada |
| 5,260,684 A | 11/1993 | Metzmaker |
| 5,316,868 A | 5/1994 | Dougherty et al. |
| 5,482,314 A | 1/1996 | Corrado et al. |
| 5,581,234 A | 12/1996 | Emery et al. |
| 5,640,145 A | 6/1997 | Newham |
| 5,652,569 A | 7/1997 | Gerstenberger et al. |
| 5,793,291 A | 8/1998 | Thornton |
| 5,802,479 A | 9/1998 | Kithil et al. |
| 5,804,887 A | 9/1998 | Holzapfel et al. |
| 5,848,661 A | 12/1998 | Hu |
| 5,949,340 A | 9/1999 | Rossi |
| 5,966,070 A | 10/1999 | Thorton |
| 6,104,293 A | 8/2000 | Rossi |
| 6,126,233 A | 10/2000 | Gaetano et al. |
| 6,127,921 A | 10/2000 | Gullner et al. |
| 6,243,634 B1 | 6/2001 | Oestreicher et al. |
| 6,259,167 B1 | 7/2001 | Norton |
| 6,259,362 B1 | 7/2001 | Lin |
| 6,272,411 B1 | 8/2001 | Corrado et al. |
| 6,357,790 B1 | 3/2002 | Swann et al. |
| 6,412,813 B1 | 7/2002 | Breed et al. |
| 6,489,889 B1 | 12/2002 | Smith |
| 6,490,515 B1 | 12/2002 | Okamura et al. |
| 6,501,374 B1 * | 12/2002 | King et al. ............... 340/457.1 |
| 6,522,754 B1 | 2/2003 | Long et al. |

(Continued)

*Primary Examiner*—Tai T Nguyen
(74) *Attorney, Agent, or Firm*—Allen D. Hertz

(57) ABSTRACT

A warning system for notifying another person when a child is left in a child safety seat. The system recognizes a child in a child safety seat by either a pressure pad or a secured child seat lap belt. The system is activated by the release of the driver's seat belt. Should a child remain in the seat when the driver's seat belt is disengaged, the system alarms notifying the driver of such. The alarm would include a calm audio output such as a lullaby, a song, or a story. The system can be integrated into the OEM features to provide an alert escalation process using a local alert, a vehicle alert, a wireless alert and ultimately a 911 alert.

22 Claims, 26 Drawing Sheets

U.S. PATENT DOCUMENTS

| | | |
|---|---|---|
| 6,529,810 B2 * | 3/2003 | Foo et al. ............... 701/45 |
| 6,535,137 B1 | 3/2003 | Ryan |
| 6,755,437 B2 | 6/2004 | Kraft et al. |
| 6,757,602 B2 | 6/2004 | Breed et al. |
| 6,812,844 B1 | 11/2004 | Burgess |
| 6,847,302 B2 | 1/2005 | Flanagan et al. |
| 6,870,472 B2 | 3/2005 | Gift et al. |
| 6,909,365 B2 | 6/2005 | Toles |
| 6,922,147 B1 | 7/2005 | Viksnins et al. |
| 6,922,154 B2 | 7/2005 | Kraljic et al. |
| 6,922,622 B2 | 7/2005 | Dulin et al. |
| 6,924,742 B2 | 8/2005 | Mesina |
| 6,998,988 B1 | 2/2006 | Kalce |
| 7,009,522 B2 | 3/2006 | Flanagan et al. |
| 7,218,218 B1 * | 5/2007 | Rogers ............... 340/522 |
| 7,233,235 B2 | 6/2007 | Pavlish |
| 7,378,979 B2 * | 5/2008 | Rams, Jr. ............... 340/667 |
| 2002/0161501 A1 | 10/2002 | Dulin et al. |
| 2003/0060937 A1 | 3/2003 | Shinda et al. |
| 2003/0098792 A1 | 5/2003 | Edwards et al. |
| 2003/0122662 A1 | 7/2003 | Quinonez |
| 2003/0167075 A1 | 9/2003 | Fincke |
| 2003/0222775 A1 | 12/2003 | Rackham et al. |
| 2004/0083035 A1 | 4/2004 | Ellis |
| 2005/0091892 A1 | 5/2005 | Dang |
| 2005/0179773 A1 | 8/2005 | Fujisawa et al. |
| 2006/0208911 A1 * | 9/2006 | Davis ............... 340/573.4 |
| 2007/0046451 A1 | 3/2007 | Bihya |
| 2007/0057780 A1 | 3/2007 | Bridges et al. |

\* cited by examiner

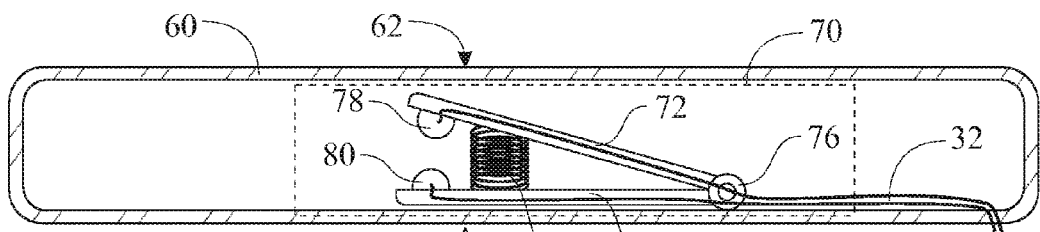
*FIG. 3A*
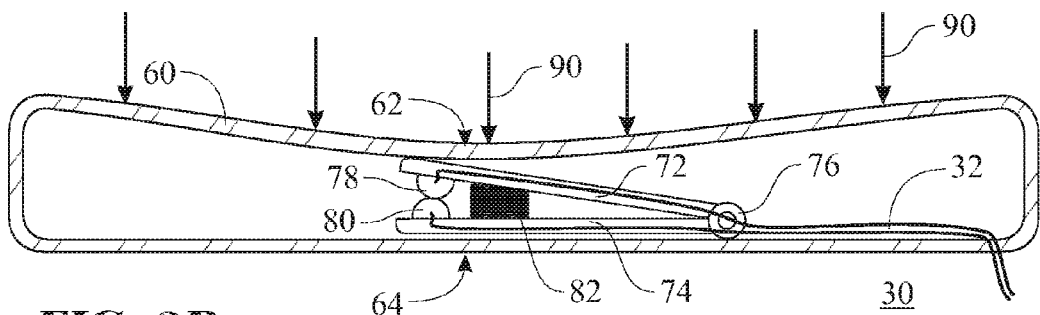
*FIG. 3B*
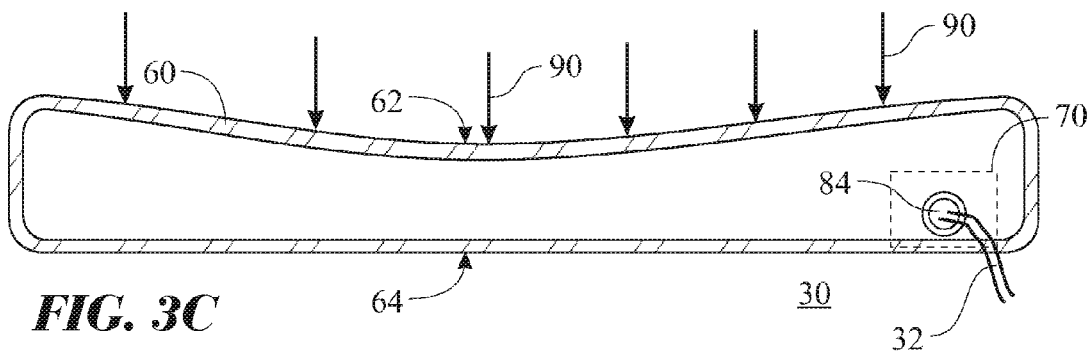
*FIG. 3C*
*FIG. 3*

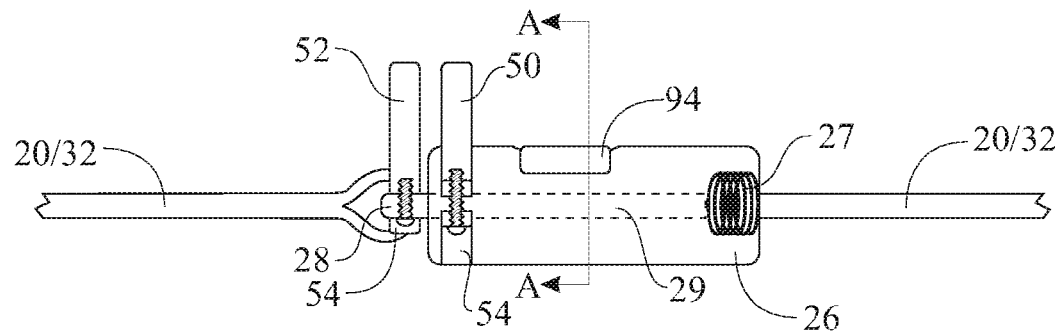
*FIG. 4A*
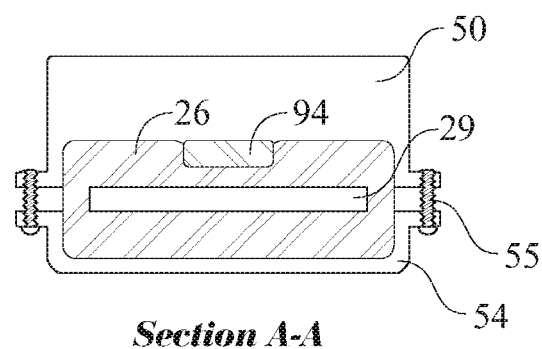
Section A-A
*FIG. 4B*
*FIG. 4*

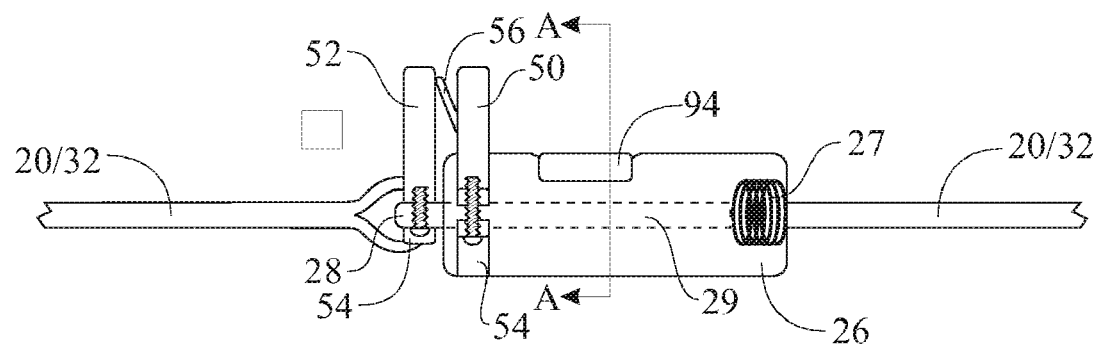
FIG. 5A
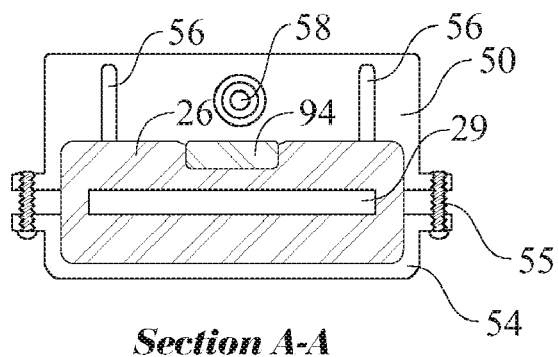
Section A-A
FIG. 5B
FIG. 5

WARNING SYSTEM FOR CHILD LEFT UNATTENDED IN VEHICLE

RELATED US PATENT APPLICATION DATA

This patent application is a Non-Provisional Application, which claims priority to Provisional Application 60/838,218 filed on Aug. 17, 2006, which is incorporated by reference herein.

FIELD OF THE INVENTION

The invention relates to an apparatus and method for alerting others that a child is left in a child safety seat inside an unattended vehicle.

BACKGROUND OF THE INVENTION

Every year there are scenarios wherein a child is injured or killed as a result of being left in an unattended vehicle, and generally from heat.

There are a number of inventions that provide a generic means for notifying a person that a child is left in a vehicle. The means of monitoring as well as the means for notification are limited and addressed by the Inventor herein.

Dublin, et al. (US Publication 2002/0161501 A1 dated Oct. 31, 2002) is a comprehensive example utilising a series of states to stop sensing, such states include:
 a. Ignition state
 b. Accelerometer
 c. External motion
 d. Door open/close Further, Dublin, et al. teaches a series of warning signals including Voice, Sound, Light, Auto Lights, Horn, CB, Cell, and other RF. To be more precise, Dublin teaches Voice, Sound, and Light as a means for warning an occupant inside the vehicle (24) of the elevated temperature inside a vehicle. Dublin is limited in that the taught means for stop sensing (16) are the standard group as identified above, further stating that warning by buzzer. Dublin is limited in the standard Voice, Sound and Light warning processes, as they are not defined in more detail. Additionally, the system is quite complex and should be incorporated as an OEM installation during the original manufacturing of the vehicle.

Smith (U.S. Pat. No. 6,489,889) teaches another occupant sensing system, again utilizing the seat belt to indicate if the seat is occupied.

Burgess (U.S. Pat. No. 6,812,844) teaches another child alert device which monitors when a door is opened via sensing the change in air pressure within a vehicle. The warning is via light and sound utilizing LED's and a speaker. Again no mention of specific sounds.

Quinonez (US Pub No. 2003/0122662) teaches a baby car seat alert and range alarm, which further operates, based upon the state of a door.

Kalce (U.S. Pat. No. 6,998,988) teaches an infant alarm system for an automobile, wherein said system is activated by a pressure sensitive pad placed onto the driver's seat.

Audible alarms are designed to be irritating to anyone that hears it. It is recognized that audible alarms are designed in this manner to entice a person to act accordingly. Although this is the general intention, a side effect is that the audible alarms scare young children.

What is desired is an alarm system that would not scare children.

Various sensors are taught which either stop sensing or stop an indication that a child is left in a child seat.

What is desired is an alarm system with a sensor that either stops sensing or stops indicating when a child left in a child seat, wherein said alarm system that can be easily installed as an aftermarket item.

SUMMARY OF THE PRESENT INVENTION

A first aspect of the present invention is child car seat alarm system.

A second aspect of the present invention is the utilization of the driver's seat belt to activate/deactivate an alarm system respective to said child car seat alarm system.

A third aspect of the present invention is the utilization of a pleasing sound as an alerting mechanism.

A forth aspect of the present invention is a weight sensing pad for identifying a child placed into a child safety seat.

A fifth aspect of the present invention is a seat belt sensing apparatus for identifying a child placed into a child safety seat.

A sixth aspect of the present invention is a control device comprising a portable power source and a control circuit.

A seventh aspect of the present invention is a low battery indicator.

An eighth aspect of the present invention is a low battery indicator, wherein said low battery indicator is an LED.

A ninth aspect of the present invention is a low battery indicator, wherein said low battery indicator is an audible indicator.

A tenth aspect of the present invention is a control device comprising a portable power source, a control circuit, and an audible output device.

An eleventh aspect of the present invention is a control device comprising a portable power source, a control circuit, and an audible output device, wherein said audible output is a pleasing sound.

A twelfth aspect of the present invention further noting said pleasing sound is music.

A thirteenth aspect of the present invention further noting said pleasing sound is an audible book.

A fourteenth aspect of the present invention further noting said pleasing sound is a lullaby.

A fifteenth aspect of the present invention is a seat belt status monitoring device that is coupled to each of the two sections of a seat belt—the buckle and the latch plate.

A sixteenth aspect of the present invention is the utilization of a proximity sensing apparatus for said seat belt status monitoring device.

A seventeenth aspect of the present invention is the utilization of a magnetic sensing apparatus for said seat belt status monitoring device.

An eighteenth aspect of the present invention is the utilization of a cantilevered switch (commonly referred to as a snap action) for said seat belt status monitoring device.

A nineteenth aspect of the present invention is the utilization of a compression switch for said seat belt status monitoring device.

A twentieth aspect of the present invention is the utilization of programmable/record-able audio files.

A twenty-first aspect of the present invention is the utilization of interchangeable cards for changeable audio output files.

A twenty-second aspect of the present invention is the incorporation of an optional recording device.

A twenty-third aspect of the present invention is the ability to provide a portable device.

A twenty-fourth aspect of the present invention is a visual alert system.

A twenty-fifth aspect of the present invention is a visual alert system, wherein said visual alert system utilizes at least one light of the vehicle.

A twenty-sixth aspect of the present invention is a driver's presence monitoring sensor.

A twenty-seventh aspect of the present invention is a driver's presence monitoring sensor, wherein said driver's presence monitoring sensor indicates the status of a driver's seat belt.

A twenty-eighth aspect of the present invention is a driver's presence monitoring sensor, wherein said driver's presence monitoring sensor identifies when a driver is sitting in a driver's seat.

A twenty-ninth aspect of the present invention is a driver's presence monitoring sensor, wherein said driver's presence monitoring sensor identifies the state of the ignition switch.

A thirtieth aspect of the present invention is a temperature monitor.

A thirty-first aspect of the present invention is a temperature monitor; wherein said temperature monitor initiates an alarm when the temperature is determined to be above a predetermined temperature.

A thirty-second aspect of the present invention is a temperature monitor; wherein said temperature monitor initiates an alarm when the temperature is determined to be below a predetermined temperature.

The disclosed aspects of the present invention define each aspect individually, wherein it is understood that each of the aspects can be combined to provide a more effective child left unattended warning system.

BRIEF DESCRIPTION OF THE DRAWING

For the purpose of initially illustrating the invention, the specification presents drawings, flow diagrams, and embodiments that are presently preferred as well as alternates. It should be understood, however, that the invention is not limited to the specific instrumentality and methods disclosed herein. It can be recognized that the figures represent a layout in which persons skilled in the art may make variations therein. In the drawings:

FIG. 3 illustrates a sectional side view of a child sensing apparatus;

FIG. 4 presents a detailed illustration of a seat belt status indicator;

FIG. 5 presents a detailed illustration of an alternate embodiment of said seat belt status indicator;

Like reference numerals refer to like parts throughout the several views of the drawings.

Figure 1:
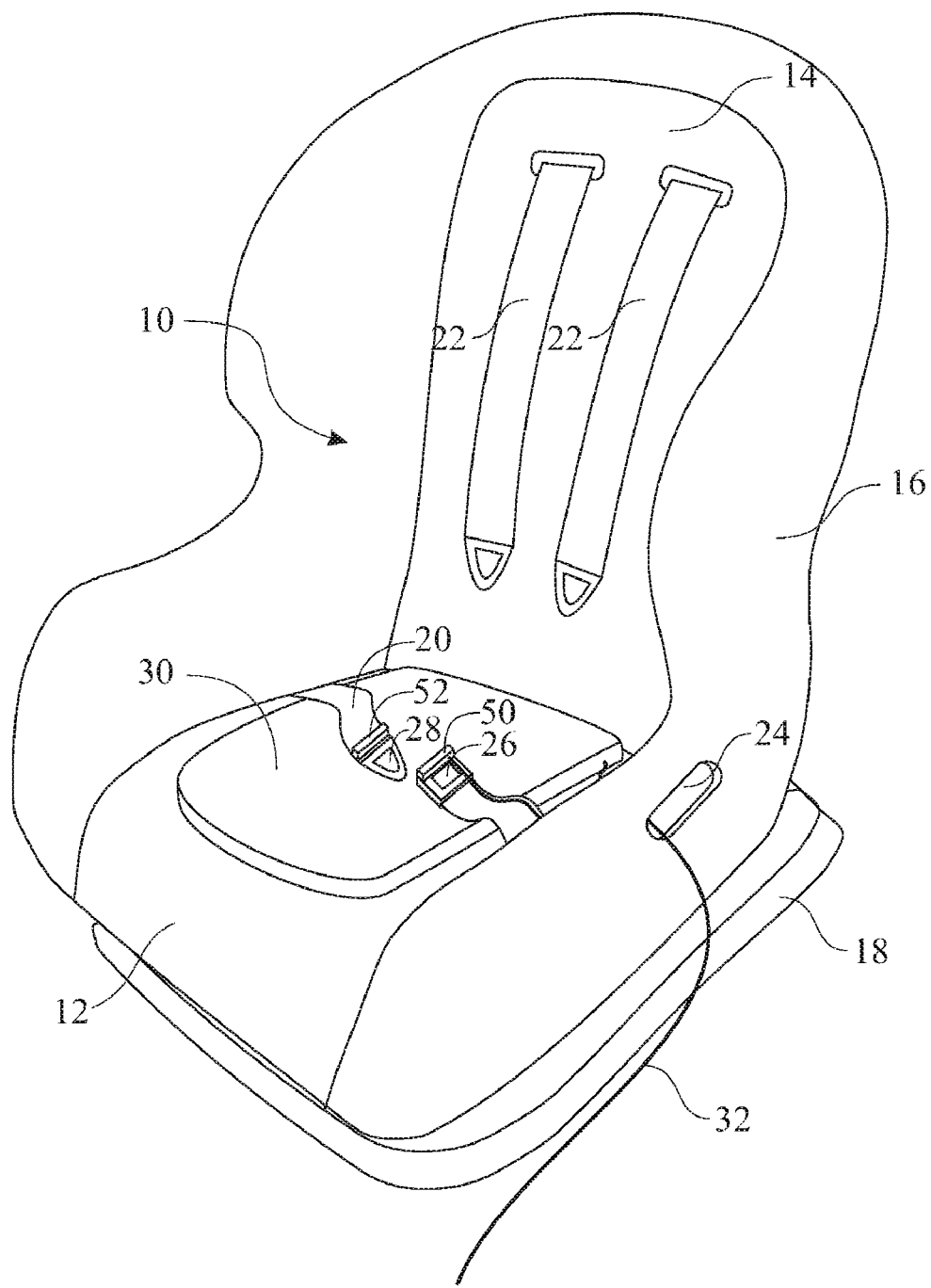
FIG. 1 presents an isometric view of a child safety seat comprising a portion of the present invention.

The figures illustrated are representative of the present invention and the scope of the present invention should comprise the concept and not be limited to the exact teachings within.

DETAILED DESCRIPTION OF THE DRAWING

FIG. 1 presents an isometric illustration of a child safety seat 10, said child safety seat 10 comprising a child safety seat section 12, a child safety seat back section 14 and a child safety seat side 16 for comfortably holding an infant or child while being transported in a vehicle. The child is secured within said child safety seat 10 via a series of belts, more specifically a child safety seat lap belt 20 and a child safety seat shoulder belt 22. Said child safety seat lap belt 20 is secured across the child's lap. Said child safety seat shoulder belt 22 is secured across the child's torso. This series of belts ensures the child remains in said child safety seat 10 during any violent motion such as during an auto accident. Said child safety seat 10 further comprising a child safety seat base 18 which ensures said child safety seat 10 remains in an upright position during use and a child safety seat securing aperture 24 or similar as a means for securing said child safety seat 10 to a vehicles seat. Elements of the present invention include a child safety alert sensing pad 30 and a child safety alert sensing cable 32. When a child is placed into said child safety seat 10, the weight of the child changes the state of the output of said child safety alert sensing pad 30. Details of the operation of said child safety alert sensing pad 30 will be provided later herein. Also included is an optional, removable seat belt status indicator consisting of a secured belt indicator sensor 50 and a secured belt indicator sensor actuator 52. Said secured belt indicator sensor 50 would be secured to a seat belt buckle 26 of said child safety seat shoulder belt 22 and said secured belt indicator sensor actuator 52 would be secured to a seat belt latch plate 28 of said child safety seat shoulder belt 22. When said seat belt buckle 26 and seat belt latch plate 28 are coupled, said secured belt indicator sensor 50 and said secured belt indicator sensor actuator 52 would indicate a closed belt status. Details of said secured belt indicator sensor 50 and said secured belt indicator sensor actuator 52 will be provided later herein.

Figure 2:
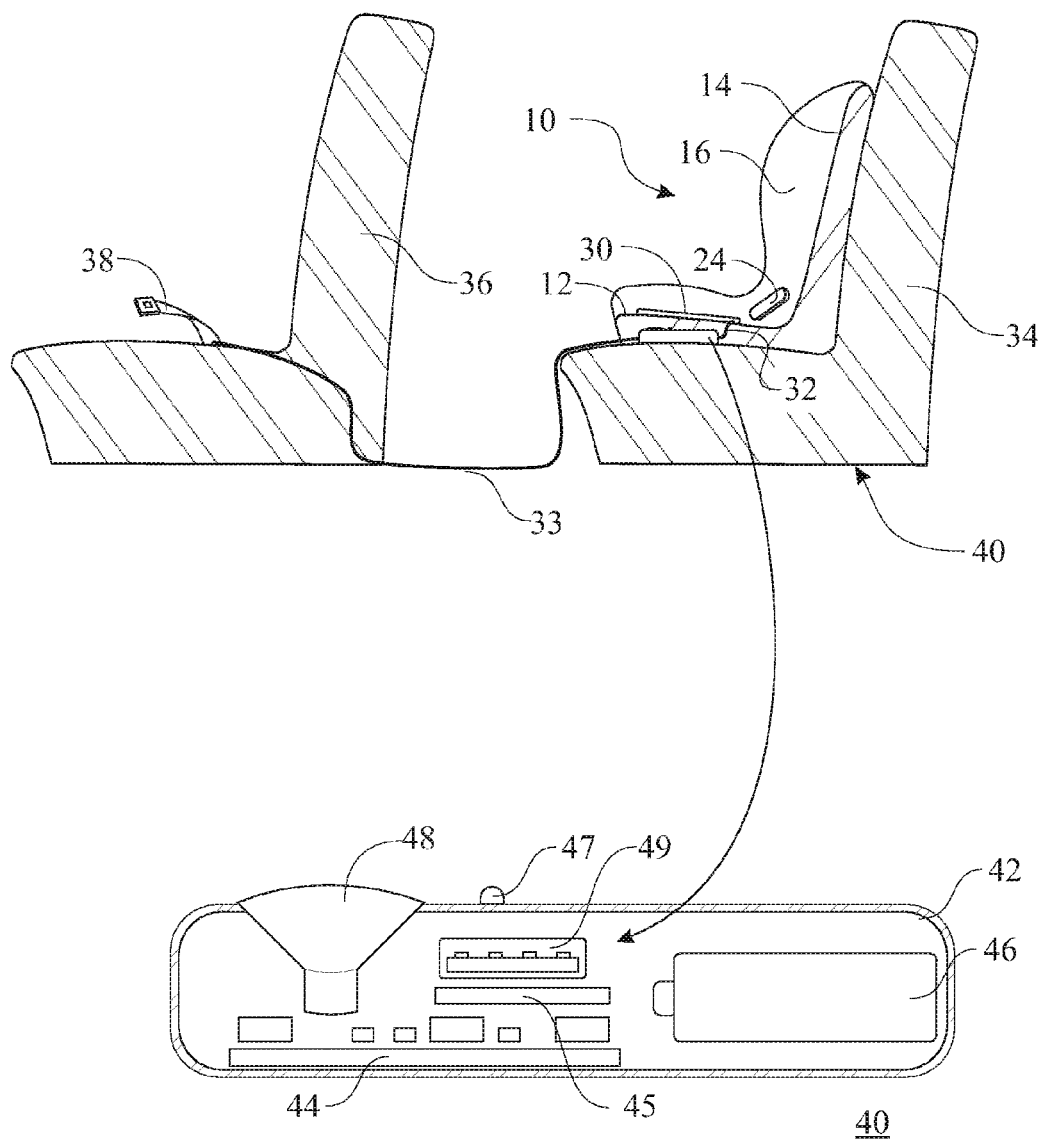
FIG. 2 presents a sectional side view illustrating additional features of the present invention.

FIG. 2 illustrates an installation and additional details of the present invention. Introduced are a vehicle passenger seat 34 and a vehicle driver's seat 36, shown as sectional for improved access to features of the present invention. Said child safety seat 10 would be secured to said vehicle passenger seat 34 via any of known means provided by the manufacturer of said child safety seat 10. Said child safety monitoring system would be installed by placing said child safety alert sensing pad 30 onto said child safety seat section 12 of said child safety seat 10. Said child safety alert sensing pad 30 would be electrically coupled to a child alert control unit 40 via said child safety alert sensing cable 32. When a child is placed into said child safety seat 10, the weight of the child would activate said child safety alert sensing pad 30 presenting a signal to said child alert control unit 40. Said child safety monitoring system would be activated when the driver is seated and secures a vehicle driver's seat belt 38. Said vehicle driver's seat belt 38 would comprise said secured belt indicator sensor 50 and said secured belt indicator sensor actuator 52 as applied to said child safety seat lap belt 20 and described in FIG. 1 herein. The status of said vehicle driver's seat belt 38 would be provided to said child alert control unit 40 via an electrical coupling driver's seat belt sensing cable 33. Alternately, for an Original Equipment Manufacturing (OEM) implementation, the OEM would incorporate a connector into the current wiring harness for tapping off the circuit. The child alert control unit 40 comprising at least one of a circuit and a microprocessor containing detection logic, wherein said at least one of a circuit and logic detects when said driver's presence monitoring sensor (such as said secured belt indicator sensor 50) is disengaged and when said child detection apparatus detects a child. Upon detection of both scenarios, the child alert control unit 40 provides a notification via a calm audio output. Said electrical coupling driver's seat belt sensing cable 33 would then comprise a connector which couples to the OEM harness. Said child alert control unit 40 comprising a child alert control unit enclosure 42, wherein said child alert control unit enclosure 42 encases the primary components of said child alert control unit 40, including a child alert control unit circuit assembly 44, a child alert control unit power source 46, power source status indicator 47, and a child alert control unit audio output device 48. Said child alert control unit power source 46 would preferably be a rechargeable battery. Said child alert control unit circuit assembly 44 could comprise a battery status monitoring circuit to indicate when the battery needs to be recharged or replaced. Should the battery require replacement, said battery status monitoring circuit would alert the user via any known methods such as an audible signal via said child alert control unit audio output device 48 or a visual signal via said power source status indicator 47, or both. Said child alert control unit circuit assembly 44 can comprise a number of functions, including storage of a pleasing audio output such as a song or lullaby, a controller circuit for making preprogrammed decisions and respective functions from monitoring various inputs from said child safety alert sensing pad 30, said secured belt indicator sensor 50, power management, and the like. Further, said child alert control unit 40 can comprise an audio file storage card slot 45 allowing the user to exchange the various audio output files. Said audio file storage card slot 45 can comprise a flash memory card interface, CD/DVD reader, magnetic strip card reader, smart card reader, and the like. It is recognized that said child alert control unit 40 can further comprise a recording device such as a microphone (not shown, but well understood). Alternately, said child alert control unit 40 can comprise an external interface connector 49 allowing the user to transfer or record audio output files. Said external interface connector 49 can comprise a USB interface (as shown), RS232, wireless connection, and the like. The child alert control unit 40 can be located in any configuration such as internal to the child seat 10, external to the child seat 10, below the passenger seat 34, and the like. The sensing pad 30 can alternately be a child seat belt status indicator or any other sensing apparatus taught herein or known by those skilled in the art.

FIG. 3 illustrates a cross sectional view of said child safety alert sensing pad 30. FIG. 3A illustrates a cross sectional view of said child safety alert sensing pad 30 comprising a first embodiment of a safety seat child indicator sensor 70, shown in a non-activated state. Said child safety alert sensing pad 30 comprising a safety seat child indicator 60, wherein said safety seat child indicator 60 has a safety seat child indicator top surface 62 and a safety seat child indicator bottom surface 64. Said first embodiment of said safety seat child indicator sensor 70 comprising a cantilevered switch, said cantilevered switch comprising a safety seat child indicator sensor first actuator arm 72 and a safety seat child indicator sensor opposing actuator arm 74 coupled via a safety seat child indicator sensor actuator hinge 76. Said safety seat child indicator sensor first actuator arm 72 and said safety seat child indicator sensor opposing actuator arm 74 are separated by a safety seat child indicator sensor spring 82. Electrical contact is made via a safety seat child indicator sensor first actuator contact 78 and a safety seat child indicator sensor opposing actuator contact 80 each coupled to said safety seat child indicator sensor first actuator arm 72 and said safety seat child indicator sensor opposing actuator arm 74 respectively when pressure such as a child indicator force 90 is applied to said safety seat child indicator top surface 62 as illustrated in FIG. 3B. When said child indicator force 90 is applied to said safety seat child indicator top surface 62, said safety seat child indicator sensor first actuator arm 72 is depressed causing said safety seat child indicator sensor first actuator contact 78 to contact said safety seat child indicator sensor opposing actuator contact 80 resulting in a closed circuit. The closed circuit is then communicated to said child alert control unit 40 via said child safety alert sensing cable 32. When said child indicator force 90 is removed, said safety seat child indicator sensor spring 82 returns said safety seat child indicator sensor first actuator arm 72 to a raised state creating an open circuit between said safety seat child indicator sensor first actuator contact 78 and said safety seat child indicator sensor opposing actuator contact 80. FIG. 3C illustrates an alternate embodiment for said safety seat child indicator sensor 70, wherein said alternate embodiment comprising a safety seat child indicator pressure activated sensor 84. When said child indicator force 90 is applied to said safety seat child indicator top surface 62, the result is an increase in pressure inside said safety seat child indicator 60. The resultant pressure actuates said safety seat child indicator pressure activated sensor 84. The change in state of the circuit is then communicated to said child alert control unit 40 via said child safety alert sensing cable 32. Although two embodiments are illustrated for said safety seat child indicator sensor 70, it is recognized that many others can be utilized. The form factor for said safety seat child indicator sensor 70 should not be limiting to the spirit and intent of the present invention.

FIG. 4 illustrates a first embodiment of a seat belt indicator comprising said secured belt indicator sensor 50 and said secured belt indicator sensor actuator 52, with FIG. 4A illustrating a side view and FIG. 4B illustrating a section A-A view. It is noted that said secured belt indicator sensor 50 and said secured belt indicator sensor actuator 52 can each be coupled to said child safety seat lap belt 20 or said child safety alert sensing cable 32 and thus presented as either in the illustration. Various reasons deter one from modifying the existing seat belt status indicator system. There are several distinct advantages to the present invention of utilizing the driver's seat belt as an activation system for the child seat safety alarm system. The first advantage is that it warns the driver if the driver is not wearing a seat belt and a child is in the car. A bad scenario would be where a parent dies and the child lives due to the parent driving without wearing their seat belt. A second advantage is that the installation is simplified as well as not cutting or modifying the existing safety features or design of the installed seat belt. A third advantage is that the alarm sounds immediately following the release of the driver's seat belt, while the driver is still inside the vehicle. Although using the driver's seat belt as an indicator of the presence of a driver, it can be recognized that other driver's presence monitoring sensors can be utilized such as the keys in the ignition, when an ignition switch is turned on, and the like. Said secured belt indicator sensor 50 would be coupled to said seat belt buckle 26 via a coupler such as secured belt indicator sensor coupler 54 wherein said secured belt indicator sensor 50 and secured belt indicator sensor coupler 54 are coupled via a secured belt indicator sensor coupler fastener 55, wherein said secured belt indicator sensor coupler fastener 55 can be a threaded fastener, a hinged snap, and the like. The coupling system would be designed to ensure there is not any interference with a buckle latch release button 94 used to release said seat belt latch plate 28 from said seat belt buckle 26. Alternately, said secured belt indicator sensor actuator 52 would be coupled to said seat belt latch plate 28 (or any proximate area) via another said secured belt indicator sensor coupler 54 and secured belt indicator sensor coupler fastener 55. From a functionality standpoint, said seat belt latch plate 28 would be inserted into said seat belt latch plate aperture 29 of said seat belt buckle 26 and be secured by a latching mechanism (not shown). Said latching mechanism would be released by depressing said buckle latch release button 94. When said seat belt latch plate 28 is secured to said seat belt buckle 26, said secured belt indicator sensor 50 and said secured belt indicator sensor actuator 52 would be placed into a status to represent a secured seat belt. When said seat belt latch plate 28 is removed from said seat belt buckle 26, said secured belt indicator sensor 50 and said secured belt indicator sensor actuator 52 would be placed into a status to represent an unsecured seat belt. A seat belt release spring 27 is included to assist in separating said seat belt latch plate 28 from said seat belt buckle 26. In one embodiment of the present invention, said secured belt indicator sensor 50 would comprise a proximity sensor such as a magnetically activated switch (reed switch) and said secured belt indicator sensor actuator 52 would comprise a magnetic material to activate said magnetically activated switch. It is recognized that although one proximity sensing device is disclosed, there are a wide variety of proximity sensing devices that can be utilized in the same application.

FIG. 5 illustrates the features of FIG. 4 introducing additional embodiments for a sensing mechanism to sense when said secured belt indicator sensor 50 and said secured belt indicator sensor actuator 52 are positioned proximate each other. One such alternate embodiment would be a secured belt indicator lever sensor 56 that is mechanically depressed upon being placed proximate said secured belt indicator sensor actuator 52. Said secured belt indicator lever sensor 56 can be a snap action switch or any other similar type device. A second such alternate embodiment would be a secured belt indicator depression sensor 58 that is also mechanically depressed upon being placed proximate said secured belt indicator sensor actuator 52. Said secured belt indicator depression sensor 58 can be a button switch or any other similar type device. It is recognized that although two mechanical sensing devices are illustrated, there are a wide variety of mechanical sensing devices that can be utilized in the same application. Additionally, any other means of changing the state of a circuit to indicate closure of said seat belt latch plate 28 and said seat belt buckle 26 can be utilized.

Figure 6:
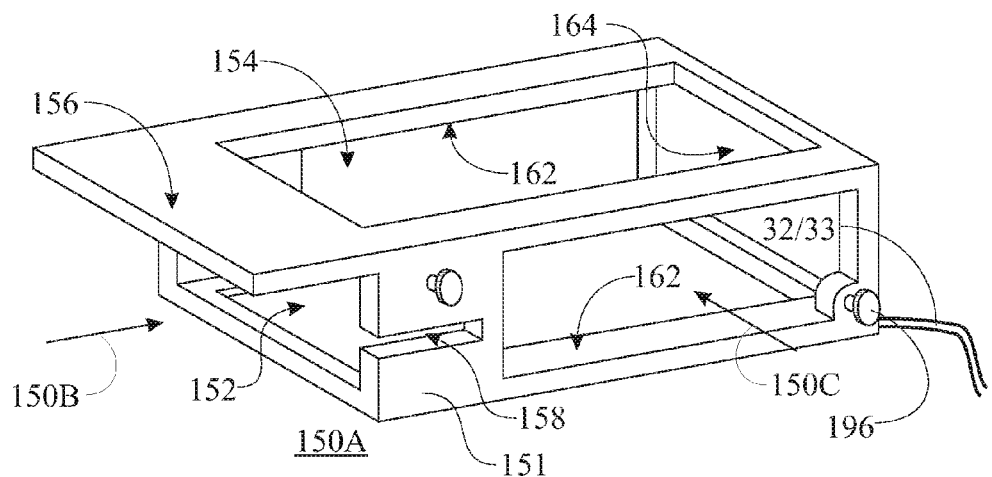
FIG. 6 presents a detailed illustration of yet another alternate embodiment of said seat belt status indicator.
Figure 6:
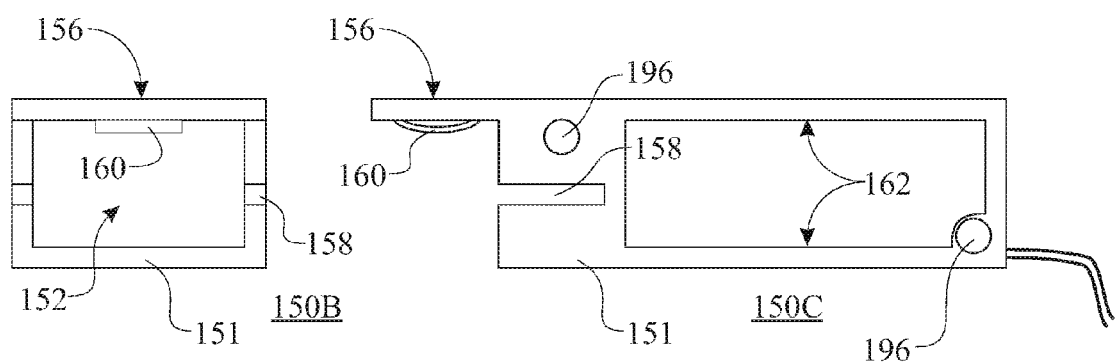

FIG. 6 illustrates yet another alternate embodiment of a seat belt status indicator, more specifically a housing style belt status indicator apparatus 150. Said housing style belt status indicator apparatus 150 is presented as an isometric view 150A, a front view 150B, and a side view 150C. Said housing style belt status indicator apparatus 150 comprising a housing style belt status indicator apparatus frame 151, wherein said housing style belt status indicator apparatus frame 151 would preferably be fabricated via an injection molding process. Said housing style belt status indicator apparatus frame 151 would comprise several openings such as a buckle receiver section 152, a buckle latch release button access area 154 and an optional buckle latch expansion clearance 158. Said housing style belt status indicator apparatus frame 151 would further comprise a housing style belt status indicator coupling section 156 for coupling of a housing style belt status indicator sensor 160. Said housing style belt status indicator apparatus frame 151 would further comprise a housing style belt status indicator buckle securing frame section 162. The functions of each of these features will be described later herein.

Figure 7:
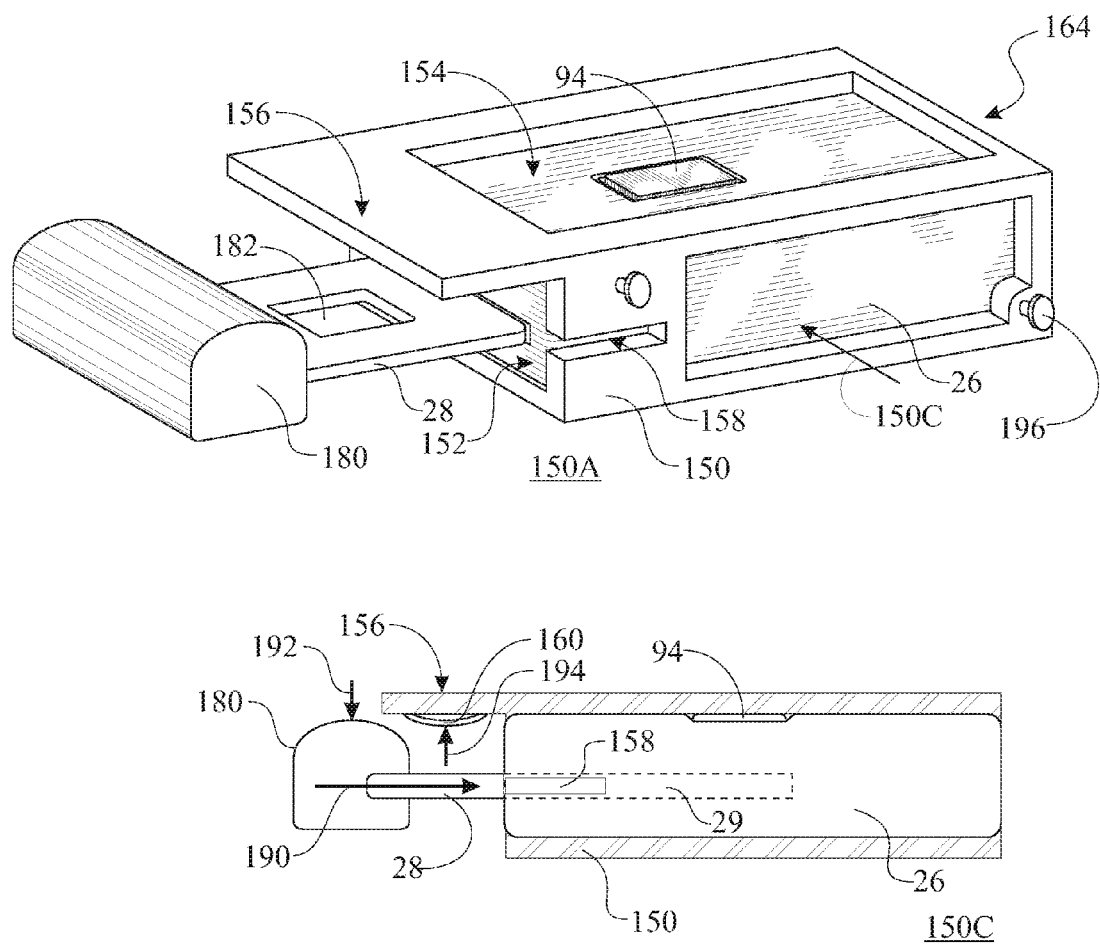
FIG. 7 illustrates said seat belt status indicator of FIG. 6 further illustrating the interaction of said seat belt status indicator with said seat belt buckle and latch.

FIG. 7 illustrates the function of the features presented in FIG. 6. Said seat belt buckle 26 is inserted into said housing style belt status indicator apparatus frame 151 and contained within said housing style belt status indicator apparatus frame 151 via said housing style belt status indicator buckle securing frame section 162. Said seat belt buckle 26 would be inserted into the rear section housing style belt status indicator apparatus rear section 164 of said housing style belt status indicator apparatus frame 151, sliding said seat belt buckle 26 towards the front of said housing style belt status indicator apparatus frame 151 into a buckle receiver section 152 as shown. Said seat belt buckle 26 is secured into said buckle receiver section 152 via any type of securing mechanism. One such design would be utilising buckle securing fastener 196, such as thumbscrews as shown. The placement and type of fastener is representative and any suitable fastener can be used as well as any suitable location. Said seat belt latch plate 28 is coupled to a belt latch belt securing member 180 which secures said child safety seat lap belt 20/vehicle passenger seat 34 to said seat belt latch plate 28. Said belt latch belt securing member 180 can be any type of material or design, including a simple loop (as shown in FIG. 5) in said child safety seat lap belt 20/vehicle passenger seat 34 or a metal fastener as illustrated. Said belt latch belt securing member 180 provides an area thicker than that of said seat belt latch plate 28. Said belt latch belt securing member 180 is inserted into said seat belt buckle 26 via a latch insertion 190. As said seat belt latch plate 28 is inserted into said seat belt latch plate aperture 29 of said seat belt buckle 26, a latch coupler sensor contacting area 192 provides a latch sensor actuation force 194 to said housing style belt status indicator sensor 160. Said latch sensor actuation force 194 causes said housing style belt status indicator sensor 160 to change state which is then utilized by the circuit and system. Said buckle latch expansion clearance 158 provides clearance for any latching mechanisms that might expand during the insertion or removal of said seat belt latch plate 28. Said seat belt latch plate 28 latches via a belt latch aperture 182 latching with a buckling mechanism (not shown, but well understood in the art). Said seat belt buckle 26 is released when said buckle latch release button 94 is depressed. Said buckle latch release button 94 is accessed via said buckle latch release button access area 154 of said housing style belt status indicator apparatus frame 151. Said housing style belt status indicator sensor 160 is coupled to said housing style belt status indicator apparatus frame 151 via said housing style belt status indicator coupling section 156. Said housing style belt status indicator sensor 160 can be any style switch to indicate when said belt latch belt securing member 180 is inserted into said seat belt buckle 26. One such switch can utilize a snap action style. Another could utilize a depression switch. Yet another can utilize the magnetic properties of said seat belt latch plate 28 via a magnetic reed switch.

Figure 8:
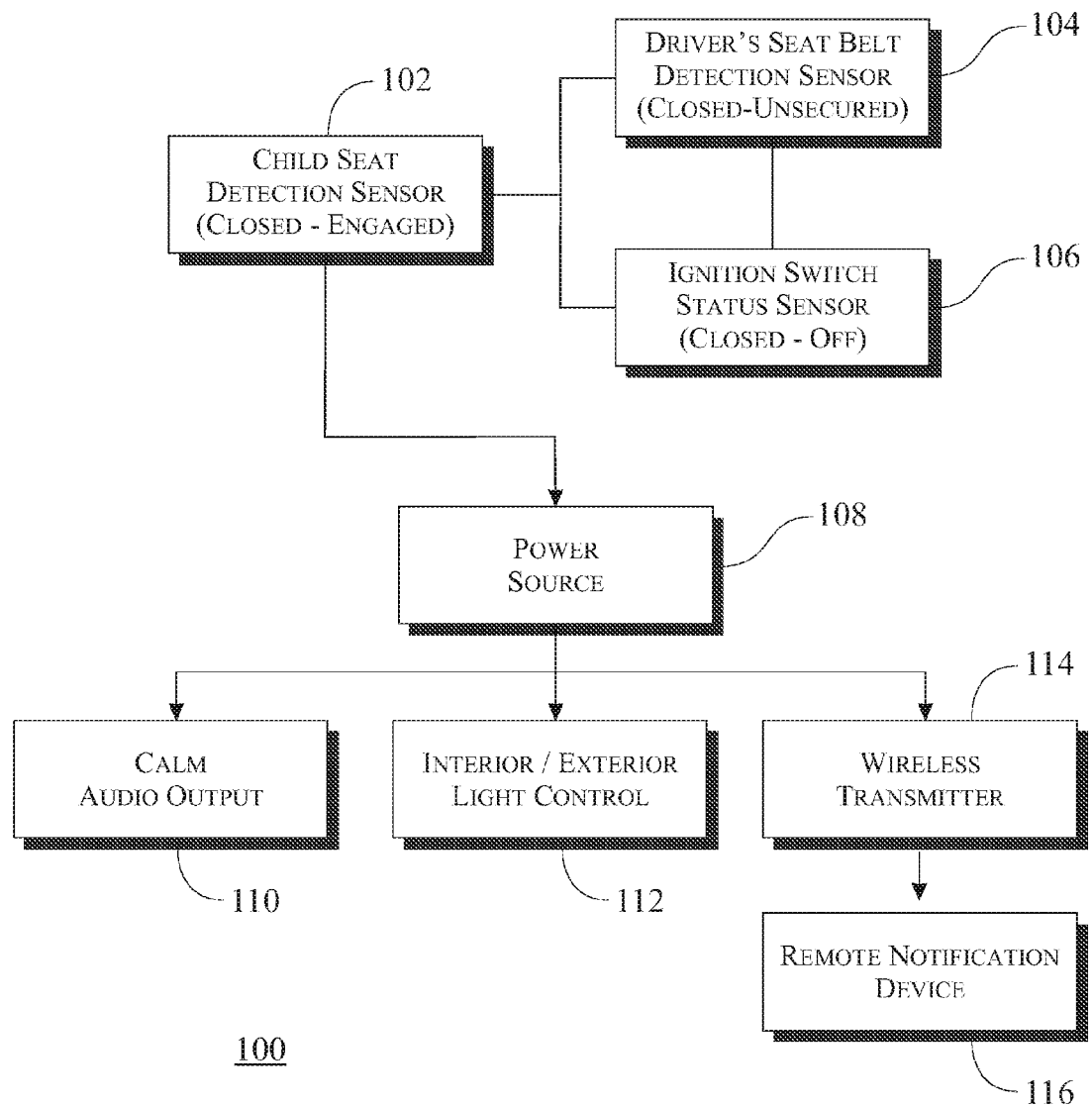
FIG. 8 presents a block diagram representative of the present invention.

FIG. 8 illustrates a child warning system block diagram 100, wherein said child warning system block diagram 100 presents a basic block diagram representative of a simple embodiment of the present invention. Said child warning system block diagram 100 comprising a circuit that is activated by at least one of a step of securing seat belt buckle 26 and said seat belt latch plate 28 of said child safety alert sensing cable 32 together in accordance with a securing driver's seat belt sensor 104 and turning an ignition switch to the on position in accordance with an ignition switch status sensor 106. Said securing driver's seat belt sensor 104 is described herein under FIG. 4 and FIG. 5. The preferred switch state would be a closed circuit when said child safety alert sensing cable 32 is unsecured about the driver. The preferred switch state would be a closed circuit when said ignition switch status sensor 106 identifies that said ignition switch is in an off status. The next switch in the circuit is a child seat detection sensor 102 such as the one described in FIG. 3 herein. Alternately, the present invention can utilize a belt sensor in conjunction with said child safety seat lap belt 20 as described herein under FIG. 4 and FIG. 5. A power source 108 is interjected into the circuit at any reasonable location. It is preferred that said power source 108 is a portable power source such as a rechargeable battery. Said power source 108 can comprise a low power indicator (not shown). Low power indicators are well known by those skilled in the art. With said child seat detection sensor 102, said driver's seat belt sensor 104 and said ignition switch status sensor 106 in a closed state, the circuit would provide power to an alarming system. Said alarming system can comprise a calm audio output 110, an interior/exterior light control mechanism 112, and a wireless transmitter 114. Said calm audio output 110 would provide a calm audio output such as a lullaby, a song, a story, and the like; all of which would not scare or cause undue stress to a child. Said interior/exterior light control mechanism 112 again does not provide undue stress to a child and would be complimentary to said calm audio output 110. Said wireless transmitter 114 again does not provide undue stress to a child and provides a remote notification to another party, such as the driver, the parent, and the like via a remote notification device 116 such as a pager, a text message, a voice message, an email, and the like. Alternately, the driver can wear a receiving device, which receives and communicates an alarm when the driver releases the seat belt and a child remains in said child safety seat 10. Said child warning system block diagram 100 presents a very basic circuit to enable the present invention. It is understood and presented later herein that additional logic circuits can be incorporated to further enhance the monitoring and/or outputs.

Figure 9:
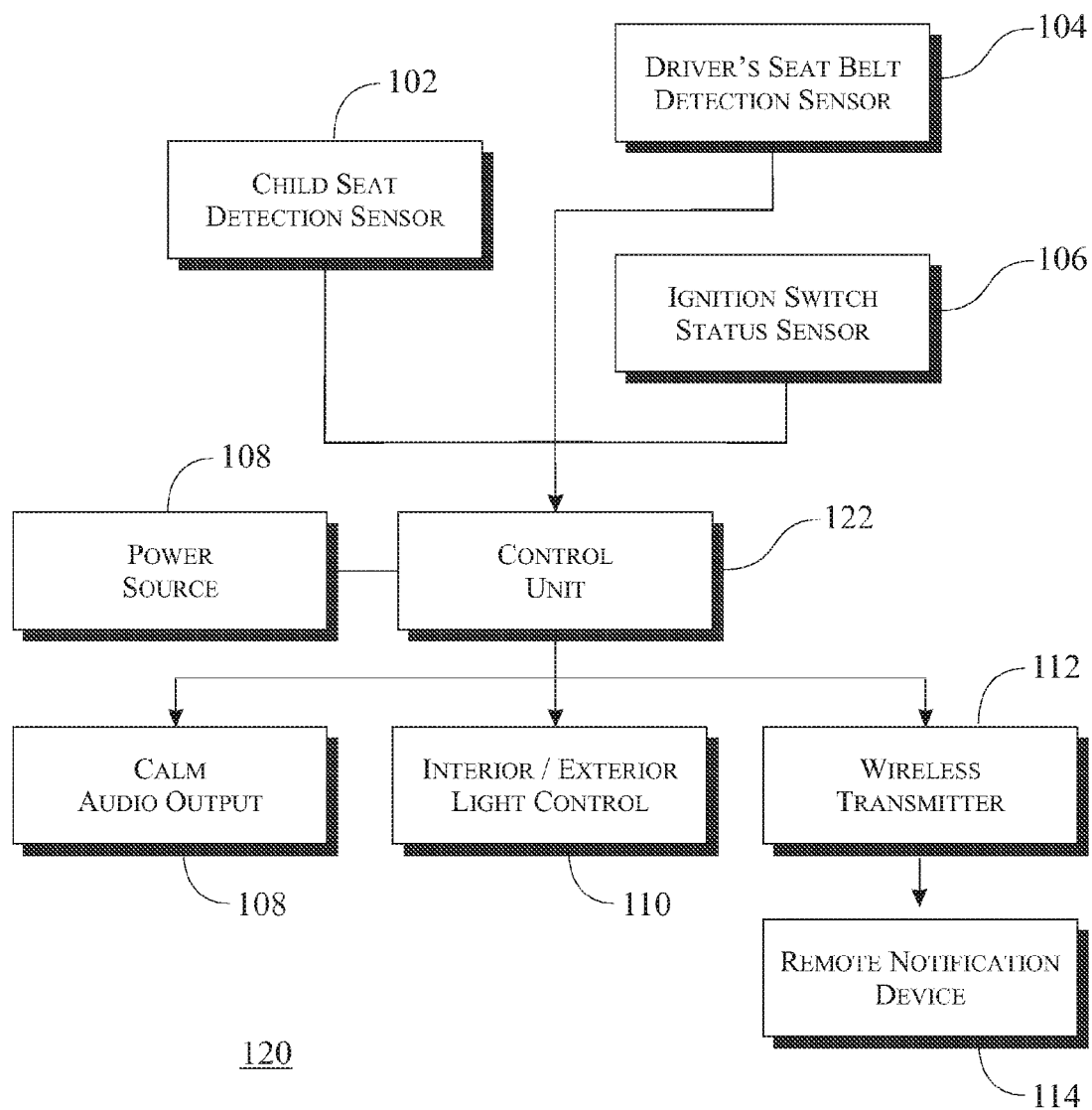
FIG. 9 presents a block diagram representative of an alternate embodiment of the present invention.

FIG. 9 illustrates the components of FIG. 8, further introducing a control unit 122, thus providing a child warning system active controlled block diagram 120. Said control unit 122 can provide additional logic by introducing active components into the circuit. Said control unit 122 can provide a number of additional features such as record-able calm audio files, temperature monitoring, power management, battery status monitoring, recording the number of times the system is activated, recording the time frame between the unlatching of said driver's seat belt and the removal of the child from said child safety seat 10, and the like. Said control unit 122 can comprise said external interface connector 49 for transferring audio files to an audio storage medium such as a flash memory chip, magnetic strip, and the like. Alternately, audio cards can be inserted into said control unit 122 wherein said audio cards would electrically couple to said child alert control unit circuit assembly 44.

Figure 10:
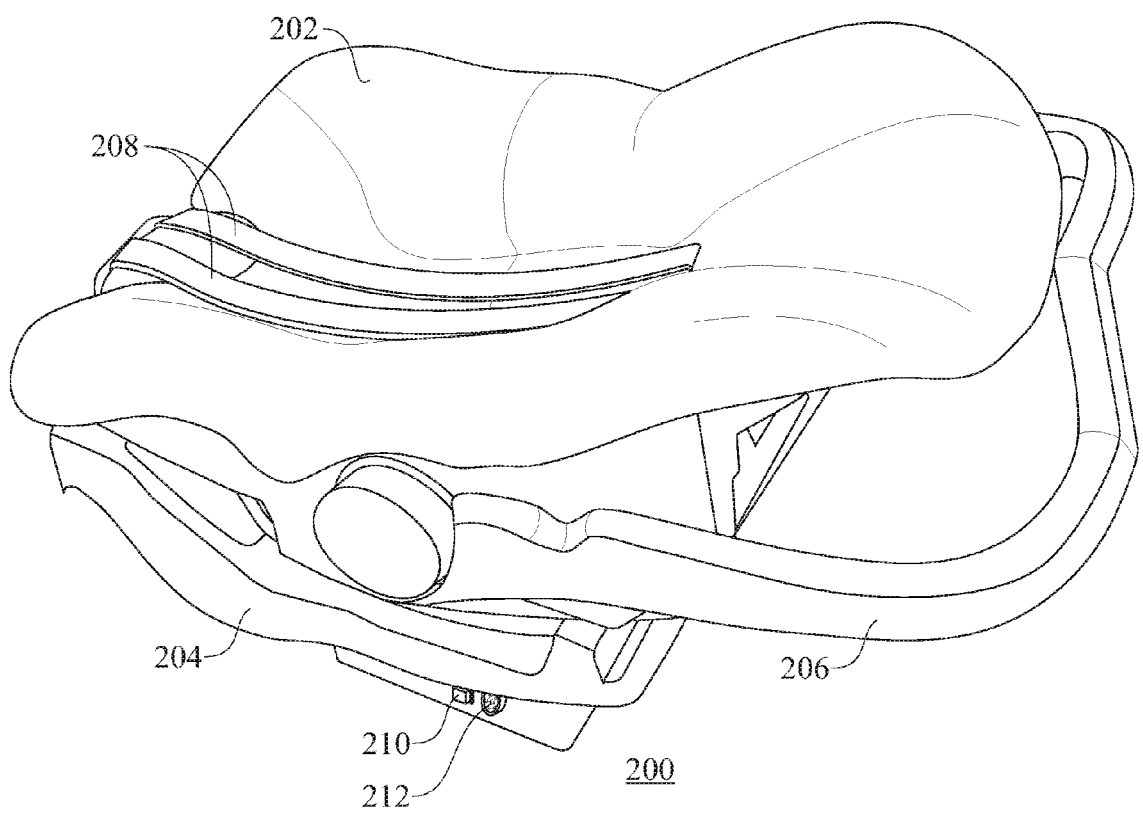
FIG. 10 presents an exemplary embodiment of a rear facing infant safety seat incorporating the present invention.
Figure 11:
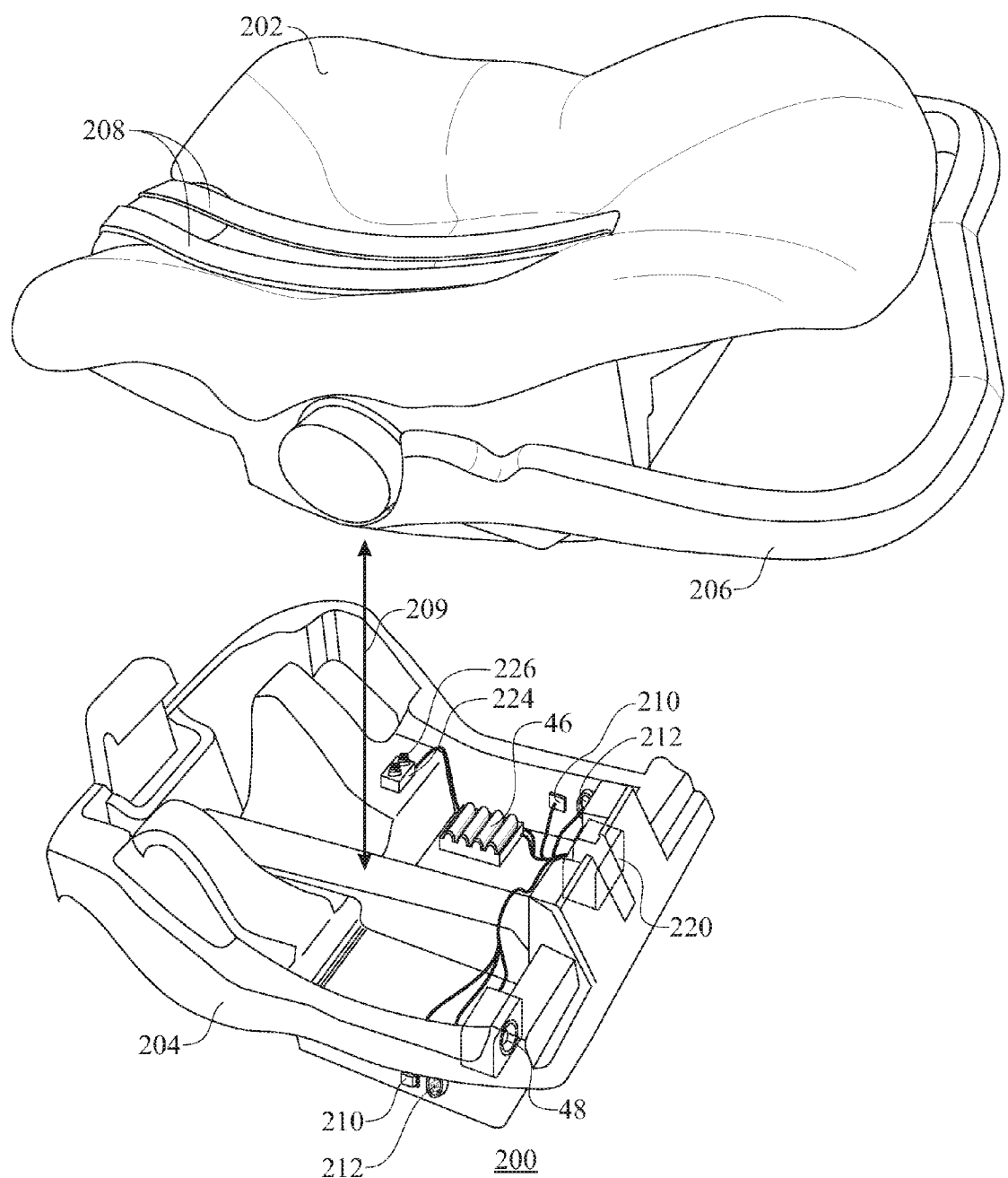
FIG. 11 presents the rear facing infant safety seat separated from a safety seat base, illustrating the components of the present invention.

FIG. 10 illustrates a removable infant safety seat 200, the removable infant safety seat 200 having a removable seat 202, which secures into an infant safety seat base 204. FIG. 11 illustrates the seat 200 separated from the seat base 204. The seat 202 includes a child seat belt 208. The seat 202 is preferred to include a carrying handle 206 for ease of portability for the user. The child monitoring system includes a monitoring control unit 220, which is powered by a power source 46. The controller is electrically interfaced to a speaker 48, an optional interrupt switch 210, and an optional seat-to-seat interface coupler 212. A base to seat electrical interface 224 is incorporated for two section seats such as the one illustrated. The electrical interface 224 would incorporate an electrical contact 226 that provides electrical connectivity between a sensor (not shown) located within the safety seat 202 and the seat base 204 via an opposing contact section (not shown but understood). The preferred embodiment incorporates two interrupt switches 210 and two seat-to-seat interface couplers 212; one on each side of the seat base 204. The child sending apparatus can be the sensing pad 30, a child seat belt status indicator similar to any other seat belt indicator taught herein, or any other sensing apparatus taught herein or known by those skilled in the art.

Figure 12:
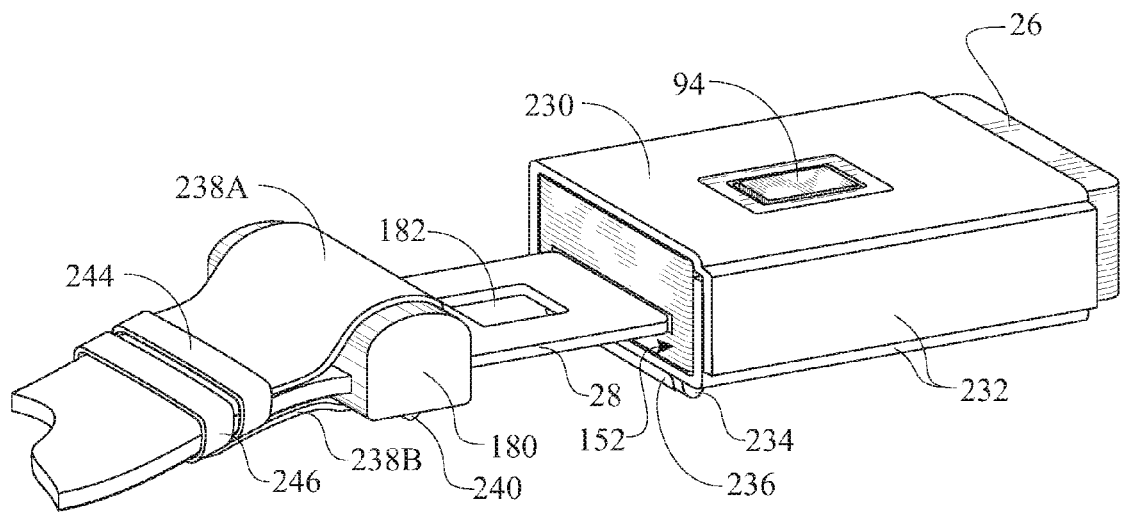
FIG. 12 presents an isometric view of an additional exemplary embodiment of the driver's seat belt monitoring sensor.
Figure 13:
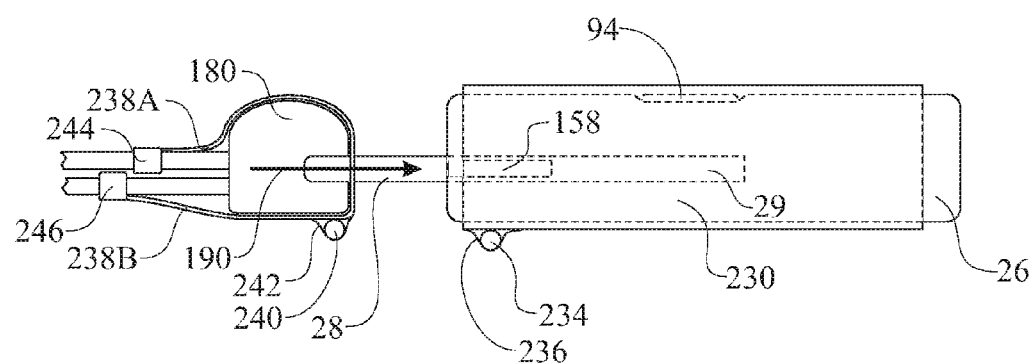
FIG. 13 a side view of the embodiment of the driver's seat belt monitoring sensor presented in FIG. 12.

FIGS. 12 and 13 present an exemplary embodiment of a driver's seat belt indicating system, the system comprising an indicator belt section 230 and an indicator latch section 238. The indicator belt section 230 is fabricated of a flexible material (stretch or non-stretch) and can include an adjustable fastening section 232. The adjustable fastening section 232 would preferably utilize a dense hook and loop fastening system, commonly referred to as Velcro®. It is recognized that other fastening systems can be used without deviating from the spirit and intent of the present invention. The adjustable fastening section 232 can be omitted if the indicator belt section 230 is fabricated using a stretch material. The adjustable fastening section 232 includes a buckle section indicator apparatus 234, which is placed within a buckle section indicator pocket 236. The preferred design utilises the switching portion of the indicator as the buckle section indicator apparatus 234, since that section is normally fixed within the vehicle. The adjustable fastening section 232 can include a cutout for access to the release button 94. The indicator latch section 238 has a cutout (not shown providing a clearance for the latch plate 28. The indicator latch section 238 would loop around the belt securing member 180 having an upper latch section 238 and a lower latch section 238B. The indicator latch section 238 incorporates a latch section indicator apparatus 240, which is placed within a latch section indicator pocket 242. The preferred design utilizes the passive portion of the indicator as the latch section indicator apparatus 238, since that section normally moves within the vehicle. Each section is secured in place via a belt fastening section; an upper fastening section 244 and a lower fastening section 246. The fastening sections comprise a material that loops around the belting portion of the driver's seat belt. By providing two separate fastening sections 244, 246, the design allows for the user to adjust the location of the latch securing member 180 on the belting portion, thus affecting the overall belt length. The indicating apparatus utilizes for the prototype is a magnetic reed switch utilizing the contacting side for the buckle section indicator 234 and the magnetic activator being used as the latch section indicator 240. It is recognized that alternate indicating devices can be utilised for the driver's seat indicating apparatus.

Figure 14:
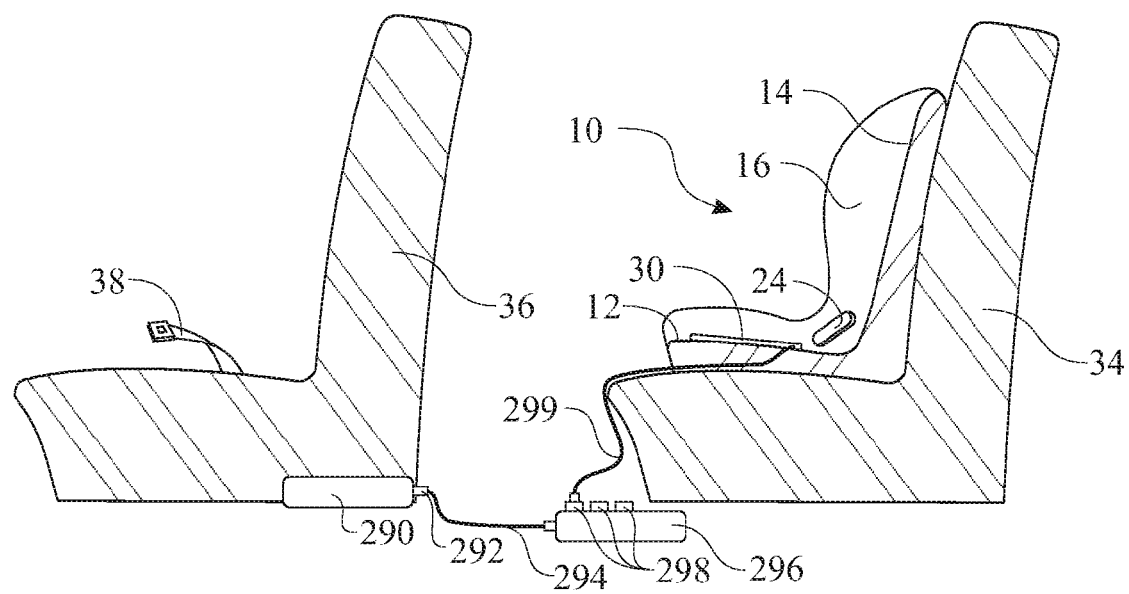
FIG. 14 present an exemplary embodiment of an alternate embodiment of the present invention, integrating the system into the Original Equipment Manufacturer (OEM) electronics system.

FIG. 14 presents a child monitoring system that is integrated into the original equipment manufacturers (OEM) status monitoring system 290. Today's OEM vehicles incorporate status monitoring systems which identify the state of various items, include closed/open doors, seat belts being latched, a person sitting in a passenger seat, and the like. By having the child monitoring system interface with the OEM status monitoring system 290, the child monitoring system can utilize features provided by the OEM status monitoring system 290. The child monitoring system connects into a vehicle interface panel 296 via a seat interface cable 299 which can be inserted into any of a plurality of vehicle panel interface connectors 298. The vehicle interface panel 296 would be connected to the OEM status monitoring system 290 via an interface cable 294 and respective interface connector 292. The vehicle panel interface connectors 298 are illustrated as raised for clarity, yet can be of any reasonable shape and size. The vehicle interface panel 296 preferably incorporates three (3) vehicle panel interface connectors 298 being the maximum number of child seats per vehicle passenger seat 34.

Figure 15:
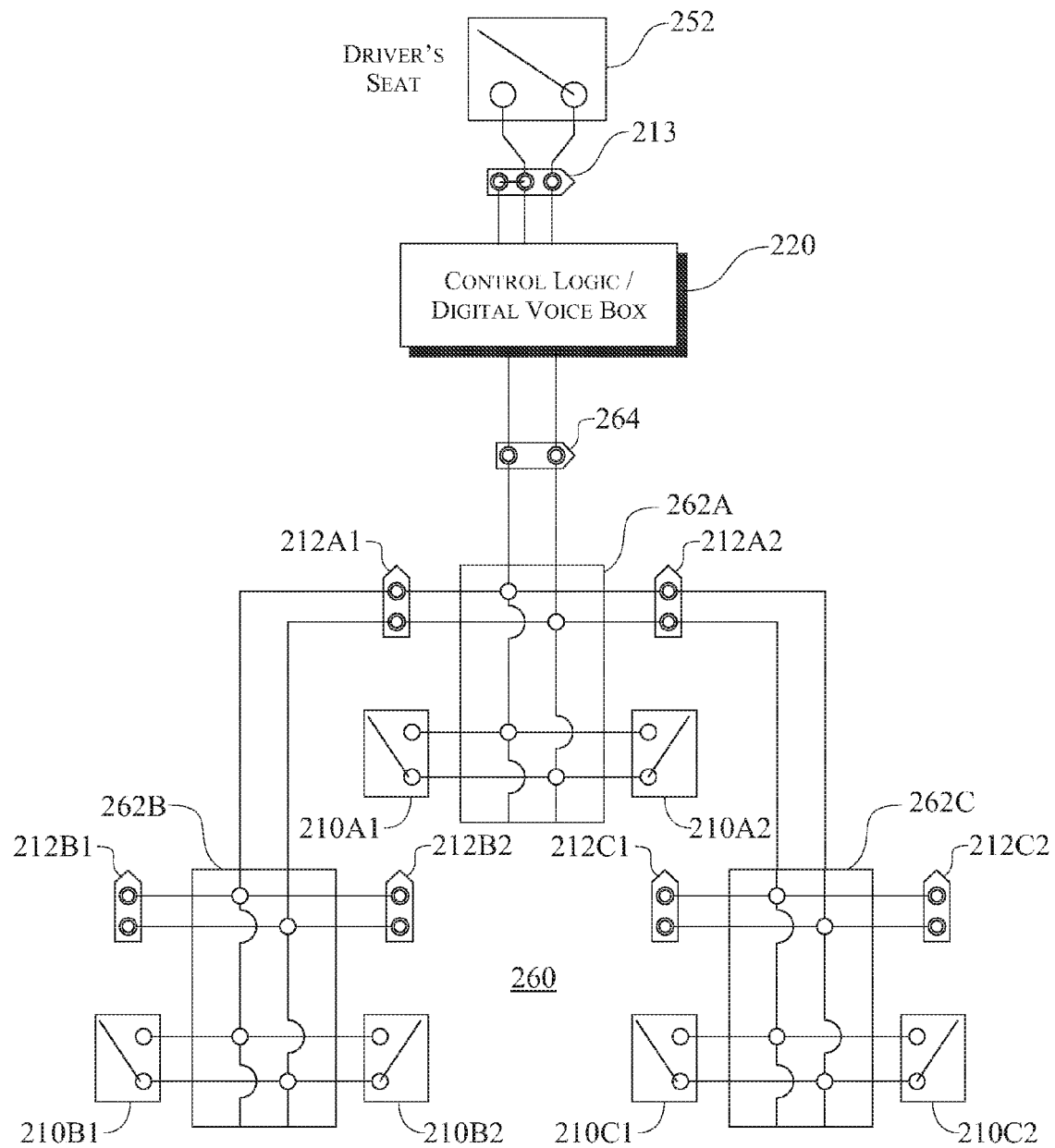
FIG. 15 presents an exemplary block diagram illustrating the connectivity of a plurality of monitored child seats.

FIG. 15 presents a block diagram representative of a connectivity schematic of an interrupt schematic 260 having a plurality of child safety seats and the single digital control unit 220. The single digital control unit 220 incorporates two (2) interface points: (1) a driver's seat status interface and switch connector 213 and a child seat-to-seat connector 212. The illustration presents three (3) child seat reset schematics, identified by a suffix of A, B, and C. Each child seat reset schematic further has a left and a right side identified by a suffix of 1 and 2. For descriptive purposes, the first child seat reset schematic will be described herein. The child seat reset schematic comprising two interrupt switches 2102A1 (first side) and 210A2 (second side). The interrupt switches 212 are incorporated in a parallel circuit as illustrated within the reset switch connectivity schematic 262. The second and third monitored seats are connected via the child seat-to-seat connector 212. Each seat preferably includes two (2) seat-to-seat connectors 212A1 (first side) and 212A2 (second side). The seat-to-seat connectors 212 are also incorporated in a parallel circuit as illustrated within the reset switch connectivity schematic 262. The interrupt schematic 260 provides the user the ability to forward a reset command to the digital control unit 220 by activating any of the plurality of interrupt switches 210. An additional feature illustrated is the driver's seat status interface and switch connector 213 which provides two functions: 1) provide the signal representing the driver's seat status to the digital control unit 220 and providing a switch that selects that specific digital control unit 220 as the master when the connector 213 is connected.

Figure 16:
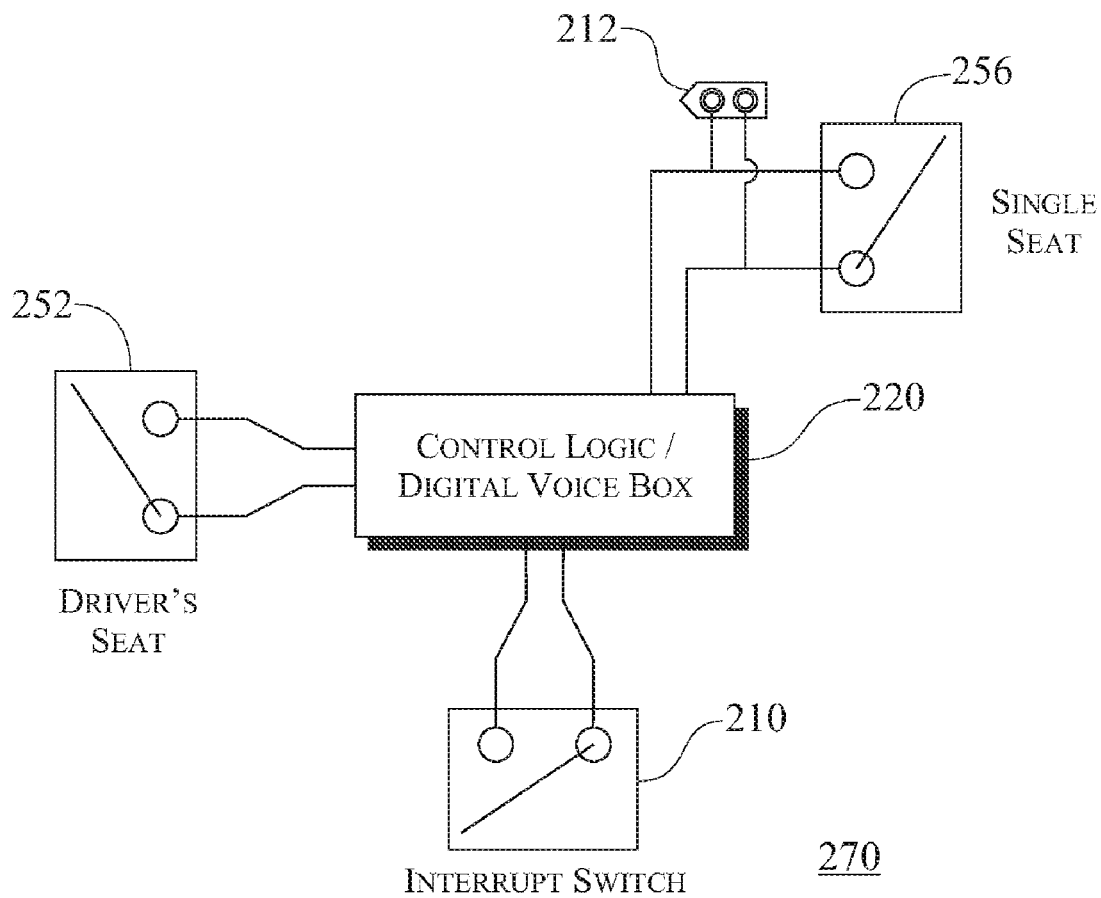
FIG. 16 presents an exemplary block diagram illustrating the circuitry of a single monitored child seat utilizing a single digital monitoring control station.

FIG. 16 presents a representative single seat monitoring schematic 270. The single seat monitoring schematic 270 includes the digital control unit 220, which interfaces with a driver's seat status monitoring sensor 252 and a single child seat status monitoring sensor 256. Additional seats can be integrated via the seat-to seat connector 212, which is placed in a parallel circuit to the child seat status monitoring sensor 256. Each seat can include two seat-to seat connectors 212, each being placed in a parallel circuit. The digital control unit 220 can optionally interface with the interrupt switch 210. Additional interrupt switches 210 can be integrated being placed in a parallel circuit to the interrupt switch 210. The interrupt switches 210 can be assembled to the digital control unit 220 or on each side of the seat base 204.

Figure 17:
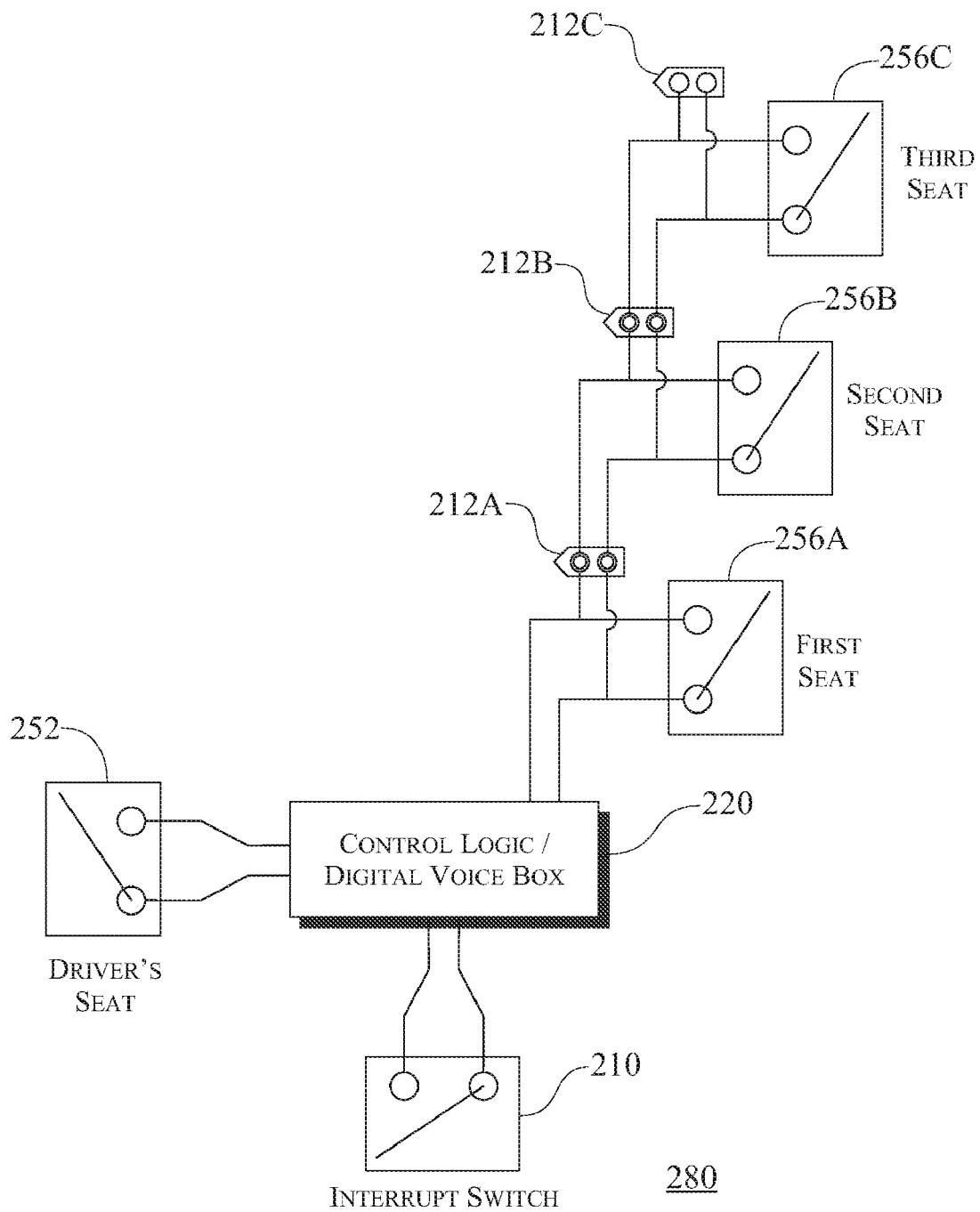
FIG. 17 presents an exemplary block diagram illustrating the circuitry a single digital monitoring control station of FIG. 16 with the addition of a plurality of monitored child seats.

FIG. 17 illustrates the schematic of FIG. 16, introducing a three seat schematic, presenting a first seat 256A, a second seat 256B, and a third seat 256C. Each are coupled via a seat-to-seat connector 212A, 212B, and 212C placing each seat in parallel. The schematic allows the digital control unit 220 to identify when a child is sitting in any of the seats. When a child is located in a seat, the sensor 256 would provide a closed circuit to the digital control unit 220. Since the seat sensors 256 are placed in a parallel circuit, the digital control unit 220 would be receive a closed circuit when any of the plurality of seats identifies the presence of a child.

Figure 18:
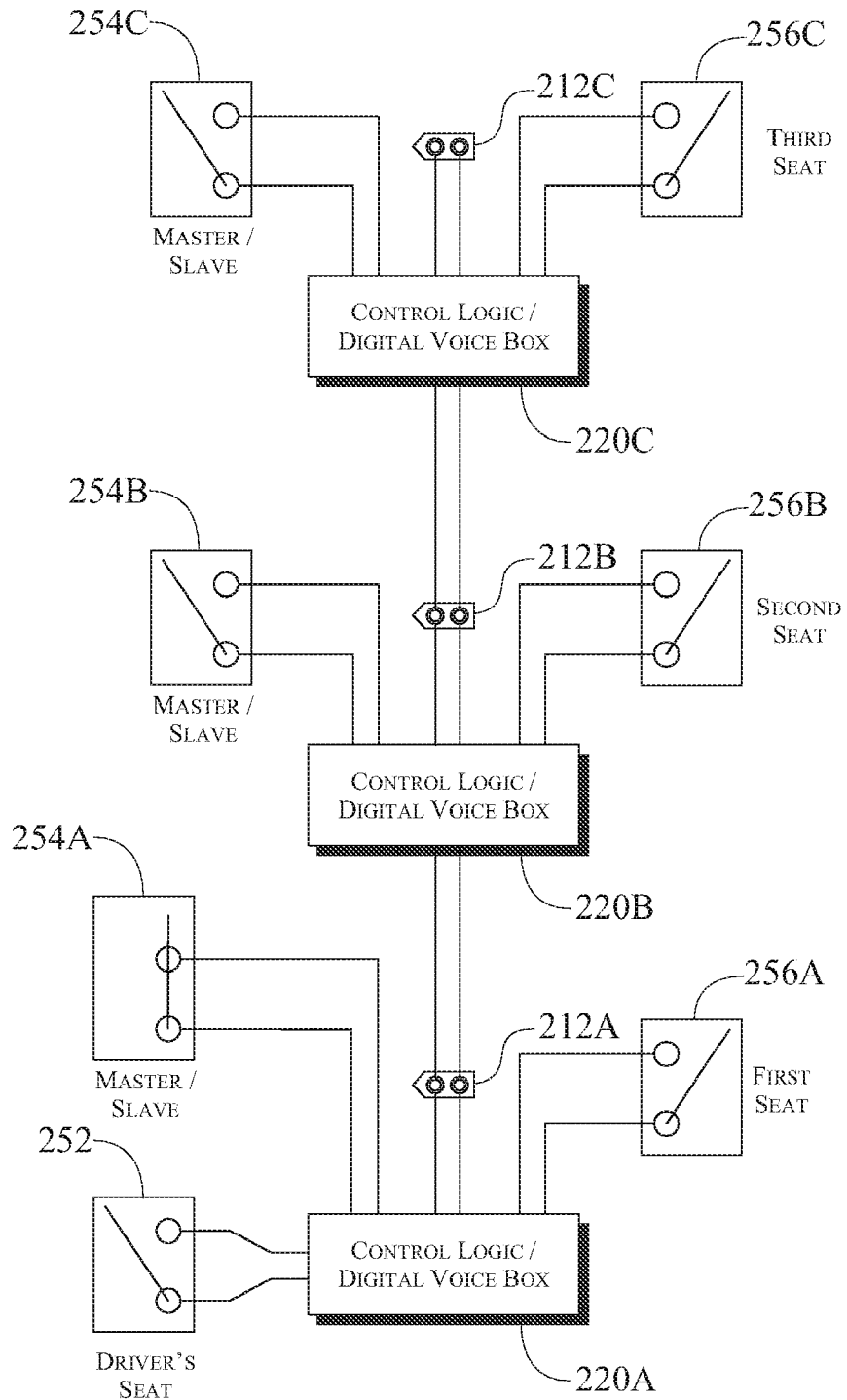
FIG. 18 presents an exemplary block diagram illustrating the circuitry of a multiple monitoring control stations configuration, integrating a plurality of monitoring child seats.

FIG. 18 presents a multi-seat monitoring schematic 282 having a plurality of digital control units 220A, 220B, and 220C, each digital control unit 220 being integrated into separate monitored seat 200. The components of each seat 200 are the same and repeated. Each individual seat 200 is identified by a suffix: A—first seat, B—second seat, and C—nth seat. The driver's seat status monitoring sensor 252 connects to one of the digital control units 220. In the illustration, the driver's seat status monitoring sensor 252 is connected to the first seat digital control unit 220A. The system then requires a means for identifying the first seat digital control unit 220A as the master digital control unit 220. This can be accomplished by a variety of ways. One such means utilizes a master-slave selector 254. The user would place the first seat master-slave selector 254A into a master state (illustrated as a closed circuit). Another such means integrates the driver's seat status interface and switch connector 213 as the master-slave selector 254, such that when the driver's seat status monitoring sensor 252 is connected to the digital control unit 220. A switch within the driver's seat status interface and switch connector 213 changes state and automatically places the respective digital control unit 220 into a master mode. The master digital control unit 220 controls the overall system. The slave digital control units 220 provide the status of each respective seat to the master digital control unit 220.

Figure 19:
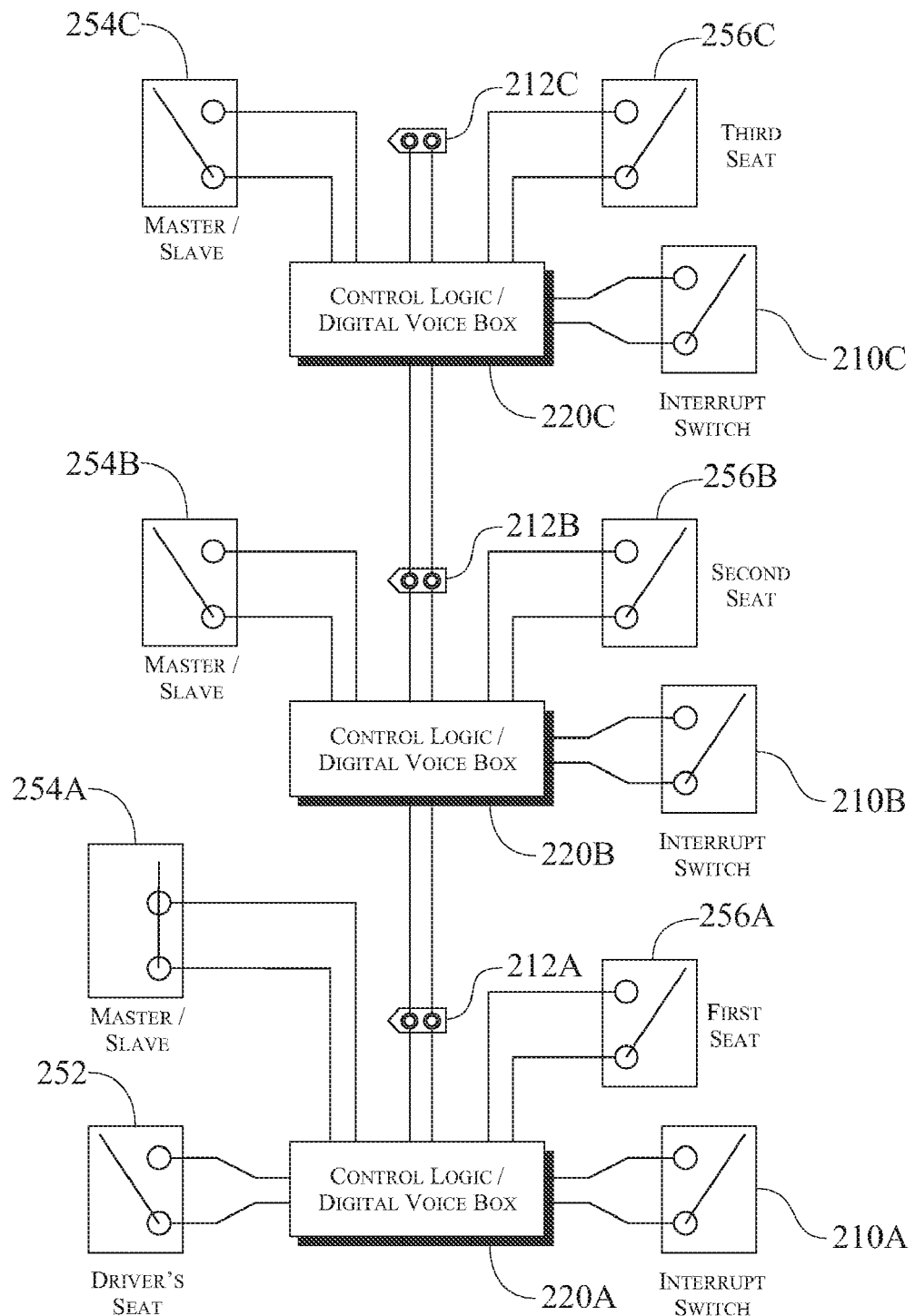
FIG. 19 presents the exemplary block diagram of FIG. 18, introducing an interrupt switch.

FIG. 19 introduces an interrupt switch 210 to each of the respective monitored child seats 200. The interrupt switch 210 allows the user to reset the system from any individual child seat 200. The slave control units 220B, 220C would forward any change in state of the interrupt switch 210 to the master control unit 220A. The master control unit would take the appropriate action upon receipt of the change in state of any interrupt switch 210A, 210B, and 210C.

FIGS. 20 through 27 present various flow diagrams representing subcomponents of the overall child monitoring system.

Figure 20:
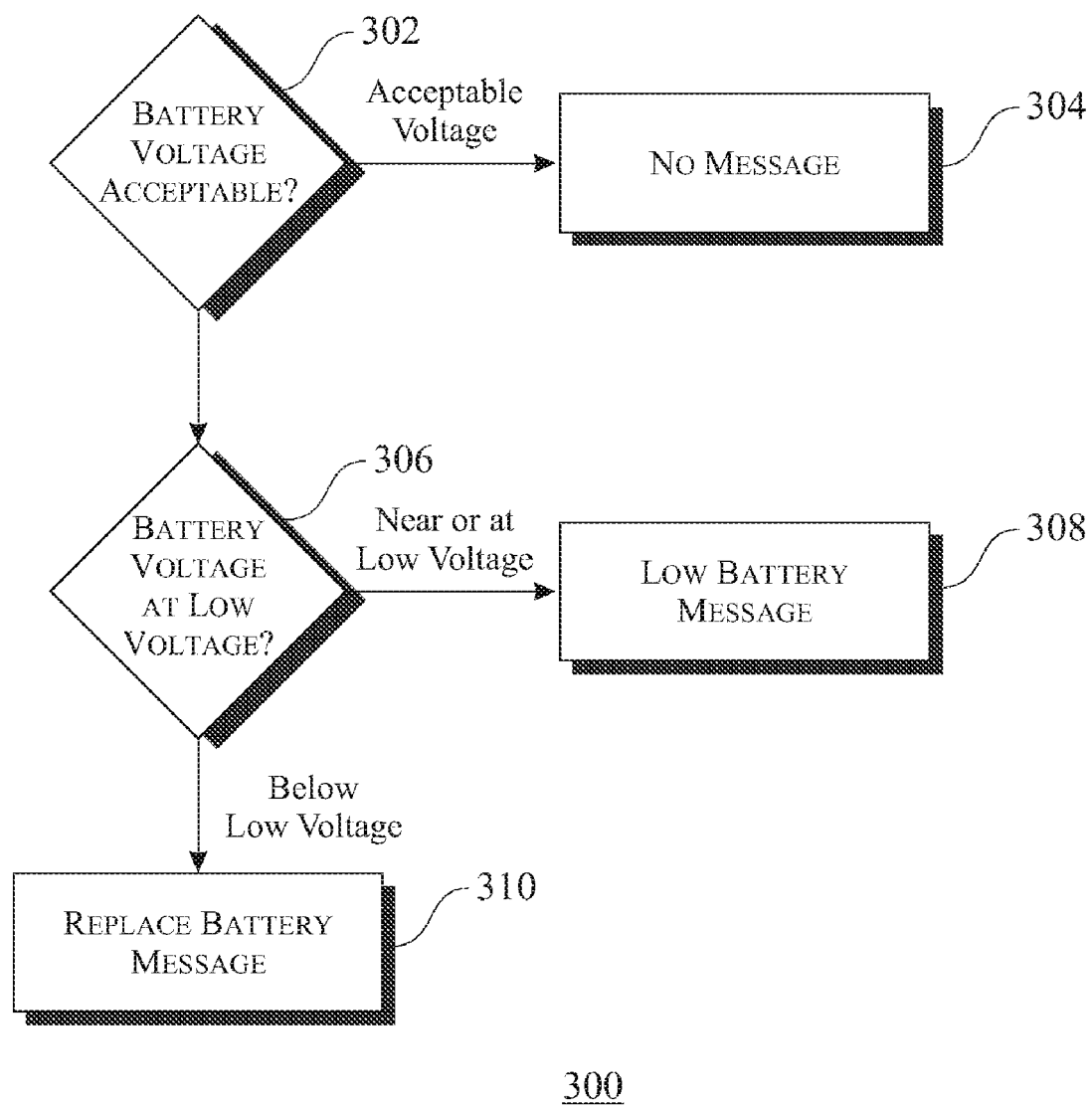
FIG. 20 presents a battery voltage check flow diagram.

FIG. 20 presents a battery voltage monitoring flow diagram 300. The battery voltage monitoring flow diagram 300 initiates with a battery voltage inspection step 320, which determines if the battery voltage is acceptable. If the battery voltage is above an acceptable voltage threshold, the process proceeds with no message 304. If the battery voltage is near or below the acceptable voltage threshold, the battery voltage monitoring flow diagram 300 proceeds with a more defined battery voltage determination step 306, which determines if the battery voltage were near or at what is considered as a low voltage, the battery voltage monitoring flow diagram 300 would activate a low battery message 308. Should the more defined battery voltage determination step 306 determine the battery voltage is below a low voltage, the battery voltage monitoring flow diagram 300 would activate a replace battery message 310.

Figure 21:
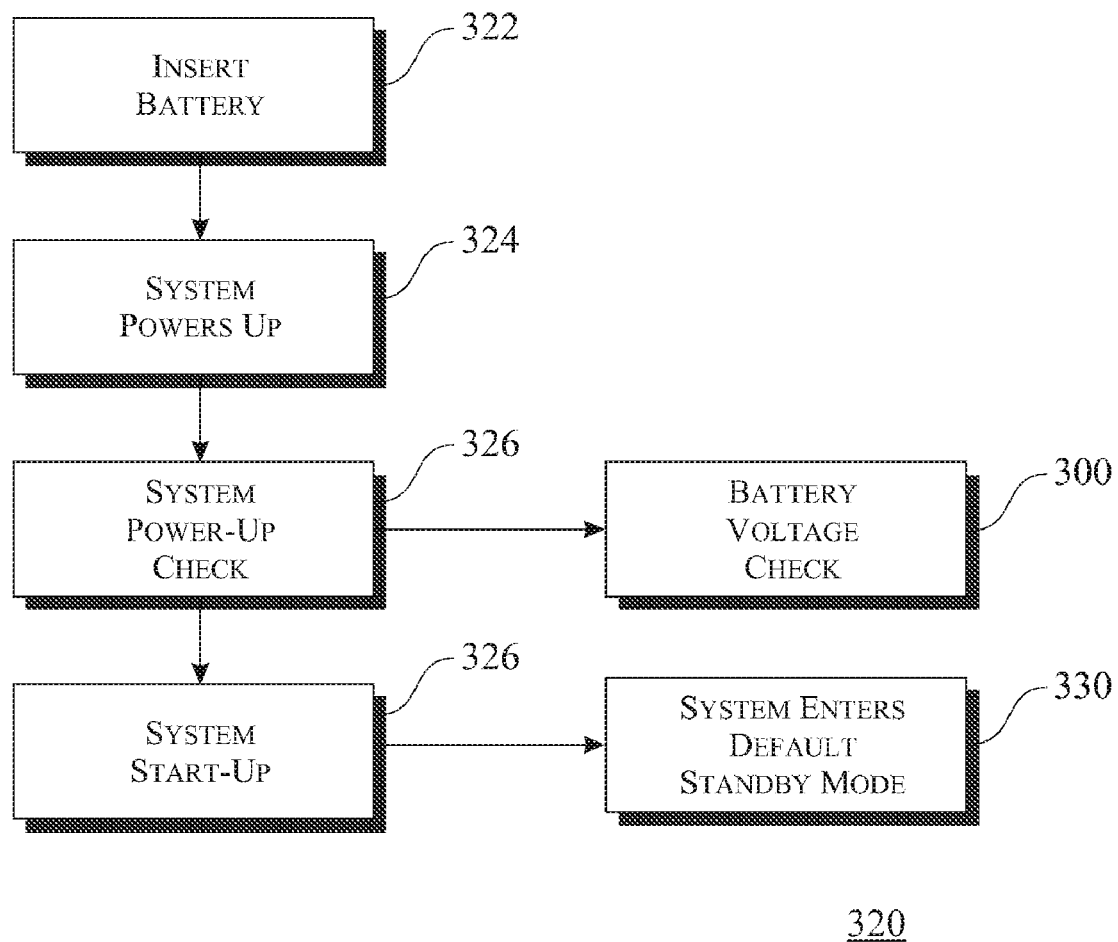
FIG. 21 presents a monitored child seat power up flow diagram.

FIG. 21 presents a child presence monitoring system start up cycle 320. The user provides power to the system as referenced by an insert battery step 322. The system completed a system power up step 324. The child presence monitoring system processes a complete power up system check step 326, including the steps associated with the battery voltage monitoring flow diagram 300. The system continues with a system start up step 326, wherein the system begins monitoring the status of the various inputs. The monitoring can be referred to as a system standby mode 330.

Figure 22:
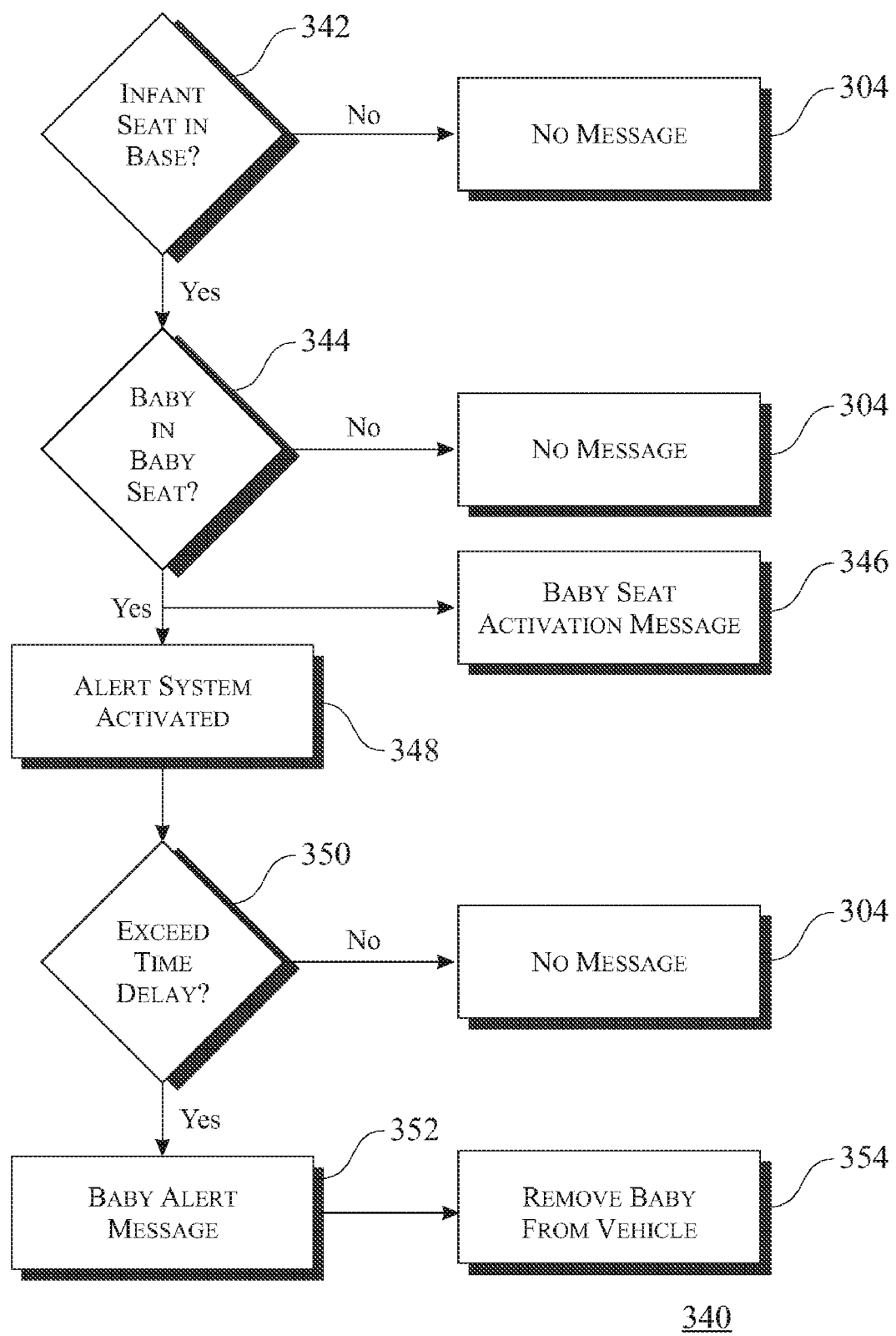
FIG. 22 presents a child seat monitoring system flow diagram.

FIG. 22 presents a detailed system initial monitoring flow diagram 340, wherein the detailed system initial monitoring flow diagram 340 comprises a subset of steps within the system standby mode 330. The digital control unit 220 monitors to determines the presence of an infant/child in the infant seat. This can be accomplished via many different methods, including the use of a sensing pad 30, a child safety seat belt monitoring apparatus similar to the driver's belt status monitoring apparatus, a seat to seat base indicator 224 and the like. If the child seat is a two component design, such as the rear facing child seat 200 of FIG. 10, the system validates the seat 202 is inserted into the seat base 204 as a seat in base detection step 342. If the seat 202 is not inserted into the seat base 204, the system proceeds with no message 304. If the seat 202 is inserted into the seat base 204, the system determines the presence of an infant/child within the seat 200 as described within a child presence detection step 344. If the child presence detection step 344 determines that a child is not present, the system proceeds with no message 304. Should the child presence detection step 344 determine that a child is present, a baby seat activation message 346 is provided. The system continues to monitor the various sensors until a change in state of any sensor occurs. Upon the change in state of a sensor, the system determines if an alert should be activated, such as in an alert system activated step 348. The most common state is when the driver releases the driver's seat belt and the presence of a child in the child seat are detected. The system recognizes that a time delay is appropriate between the time in which a driver releases the driver's seat belt 38 and when the driver would remove the child from the child seat 200. The system provides an exceed time delay decision step 350 to accommodate this scenario. The time delay decision step 350 continues with no messages 304 until the time exceeds the allowable time delay. Once the allowable time delay has been surpassed, the system initiates a baby on board alert message step 352 until the baby is removed from the vehicle 354.

Figure 23:
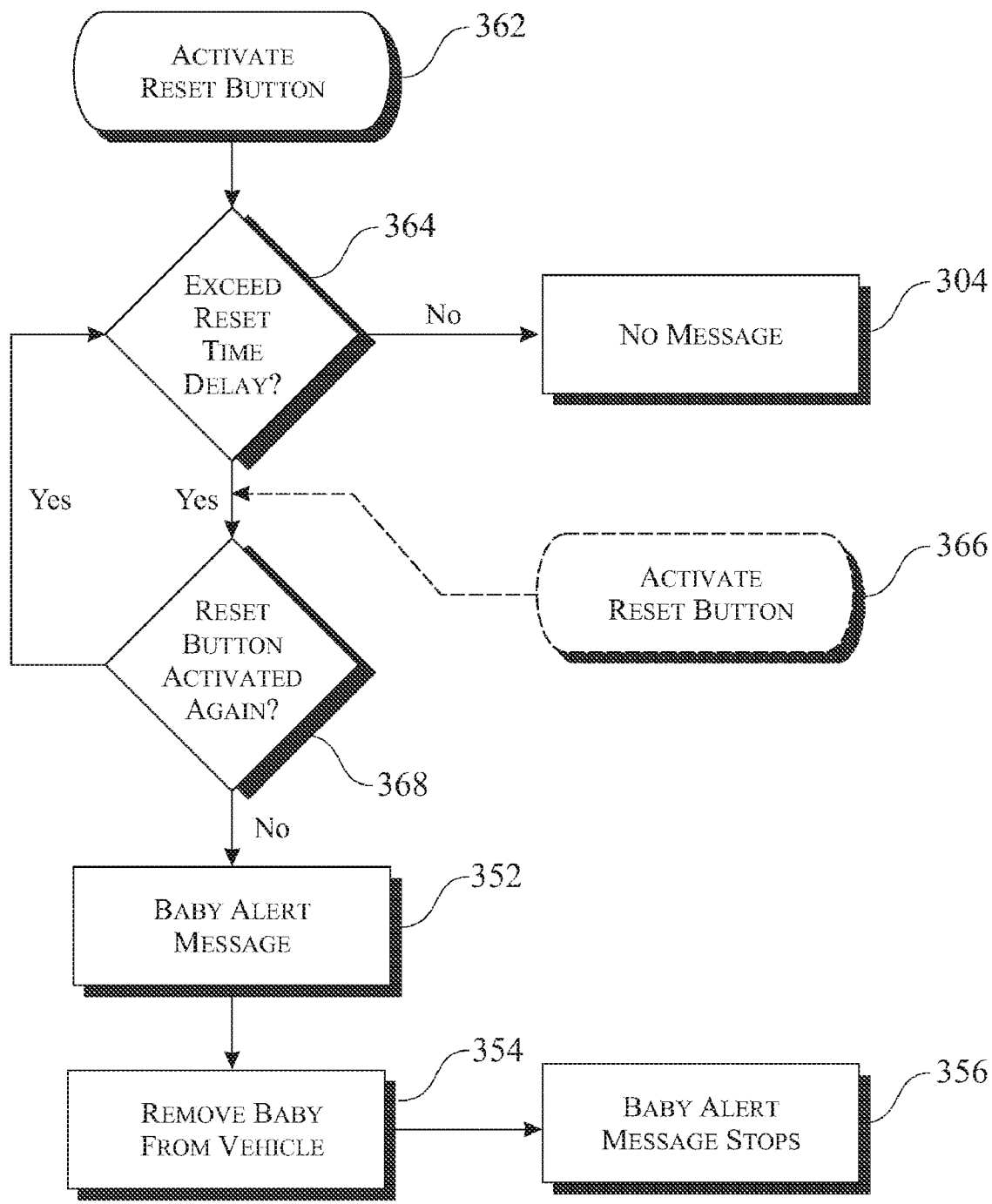
FIG. 23 presents an interrupt feature of the child seat monitoring system flow diagram.

FIG. 23 presents an interrupt switch activation flow diagram 360. The interrupt switch activation flow diagram 360 initiates with a change in state of the interrupt switch 210. The reset time delay decision step 364 continues with no messages 304 until the time exceeds the allowable time delay. Once the allowable reset time delay has been surpassed, the system initiates a baby on board alert message step 352 until the baby is removed from the vehicle 354. Once the baby is removed from the vehicle 354, the baby alert message stops 356. During the reset time delay decision step 364, the user can re-activate the reset button 366. The system would monitor for a reset reactivation event 366 in accordance with a reset button monitoring step 368. If the reset button 210 is reactivated, the interrupt switch activation flow diagram 360 returns to the reset time delay decision step 364.

Figure 24:
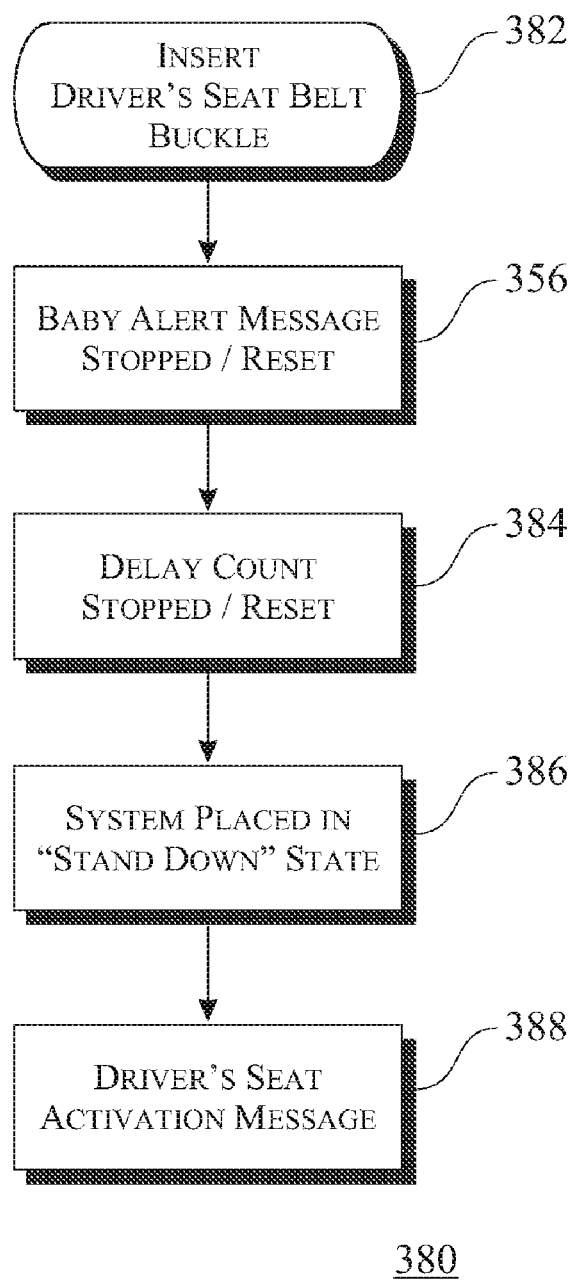
FIG. 24 presents a driver's seat insertion notification feature of the child seat monitoring system flow diagram.

FIG. 24 presents a driver's seat belt insertion step 380. The driver inserts the driver's seat belt latch 28 into the driver's seat belt buckle 26 in accordance with a driver's belt insertion step 382. When the driver's belt is secured, the system recognizes the driver's belt status and halts any active baby alert messages 356. Any in process counts or delays are stopped and reset 384. The system is placed into the "stand down" status 386 interpreting that a driver is in the driver's seat. The system can present a driver's seat activation message 388 informing the parties that the system recognizes the driver is in the driver's seat.

Figure 25:
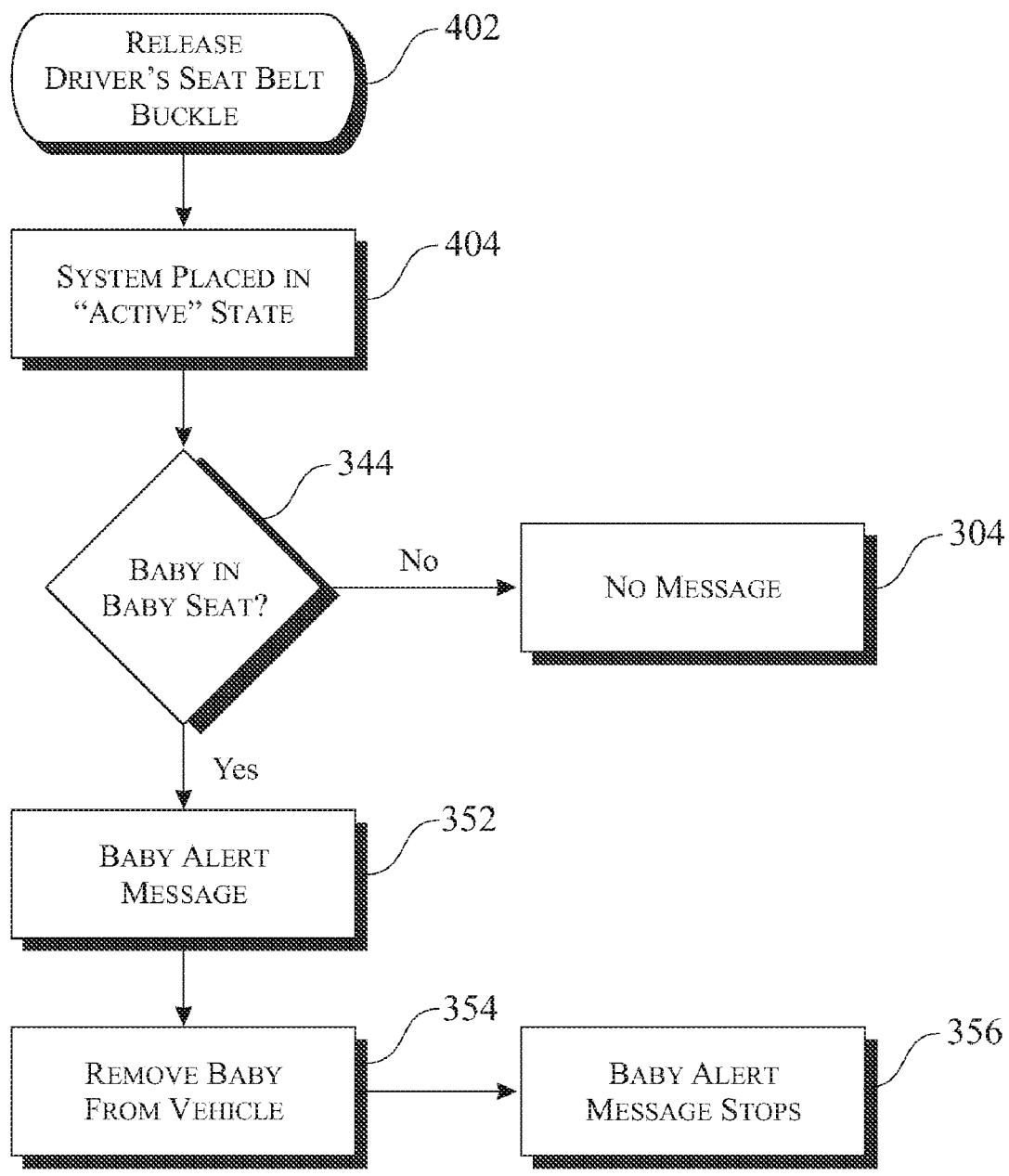
FIG. 25 presents a driver's seat release feature of the child seat monitoring system flow diagram.

FIG. 25 presents a driver's seat belt release step 400. The driver releases the driver's seat belt latch 28 from the driver's seat belt buckle 26 in accordance with a driver's belt release step 402. When the driver's belt is released, the system changes from the "stand down" status 386 to an "alert active" status 404. The system then completes a baby in seat decision step 344. If the baby in seat decision step 344 determines that a child is not present in the seat, the system proceeds with no message 304. If the baby in seat decision step 344 determines that a child is present in the seat, the system proceeds with the system initiates a baby on board alert message step 352 until the baby is removed from the vehicle 354. Once the baby is removed from the vehicle 354, the baby alert message stops 356.

Figure 26:
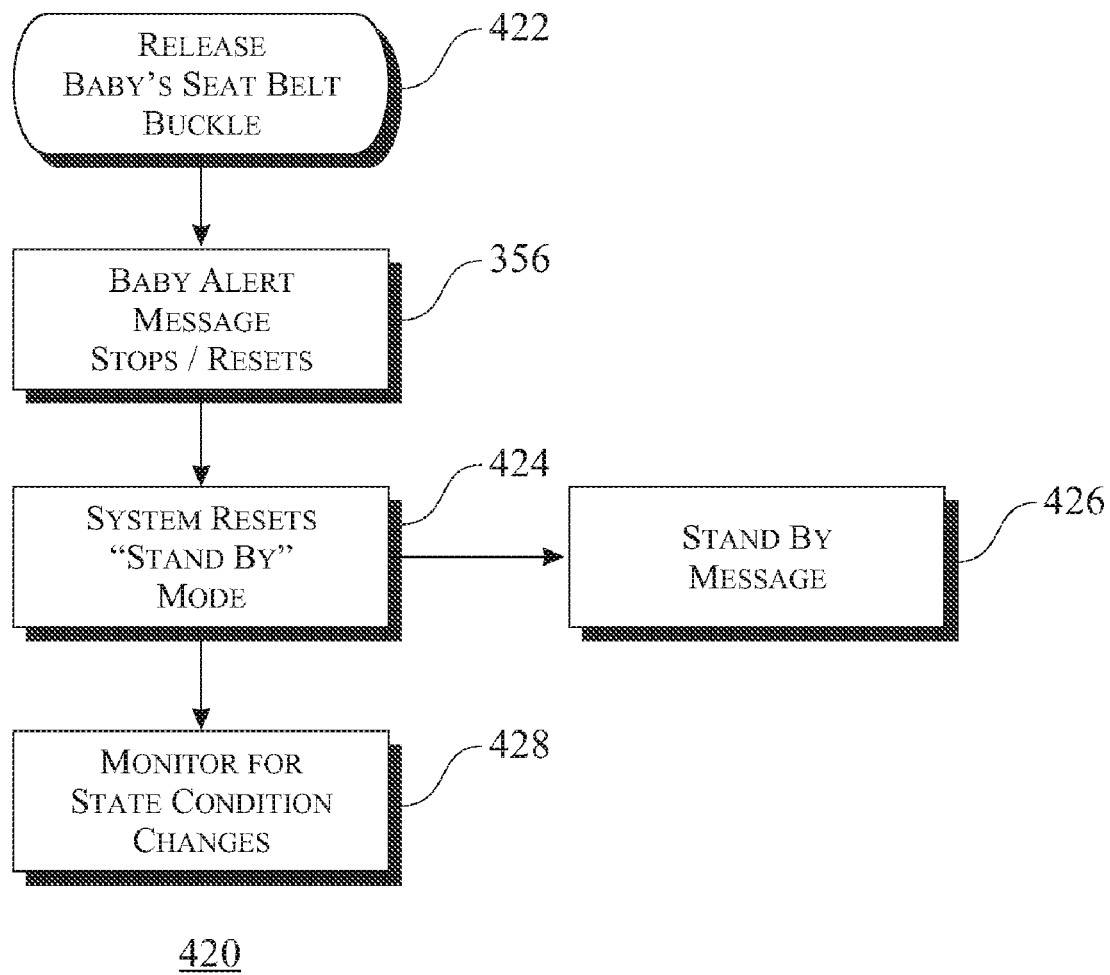
FIG. 26 presents a child's seat release feature of the child seat monitoring system flow diagram.

FIG. 26 presents a baby removal flow diagram 420. The baby removal flow diagram 420 initiates with a baby removal step 422. The baby removal step 422 can be recognized by the control unit 220 via a variety of sensors. One such sensor is the baby seat weight sensing pad 30. Another is a baby seat, seat belt monitor. Other presence sensing devices that are known by those skilled in the art can also be used. Once the presence sensing devices determined the baby is removed from the vehicle, the baby alert message stops 356. The system is placed into a no baby, stand by mode 424. The system can optionally present a stand by message 426 identifying that the system recognizes there are no children in any seats. The system continues with a monitor for changes in the various sensors step 428.

Figure 27:
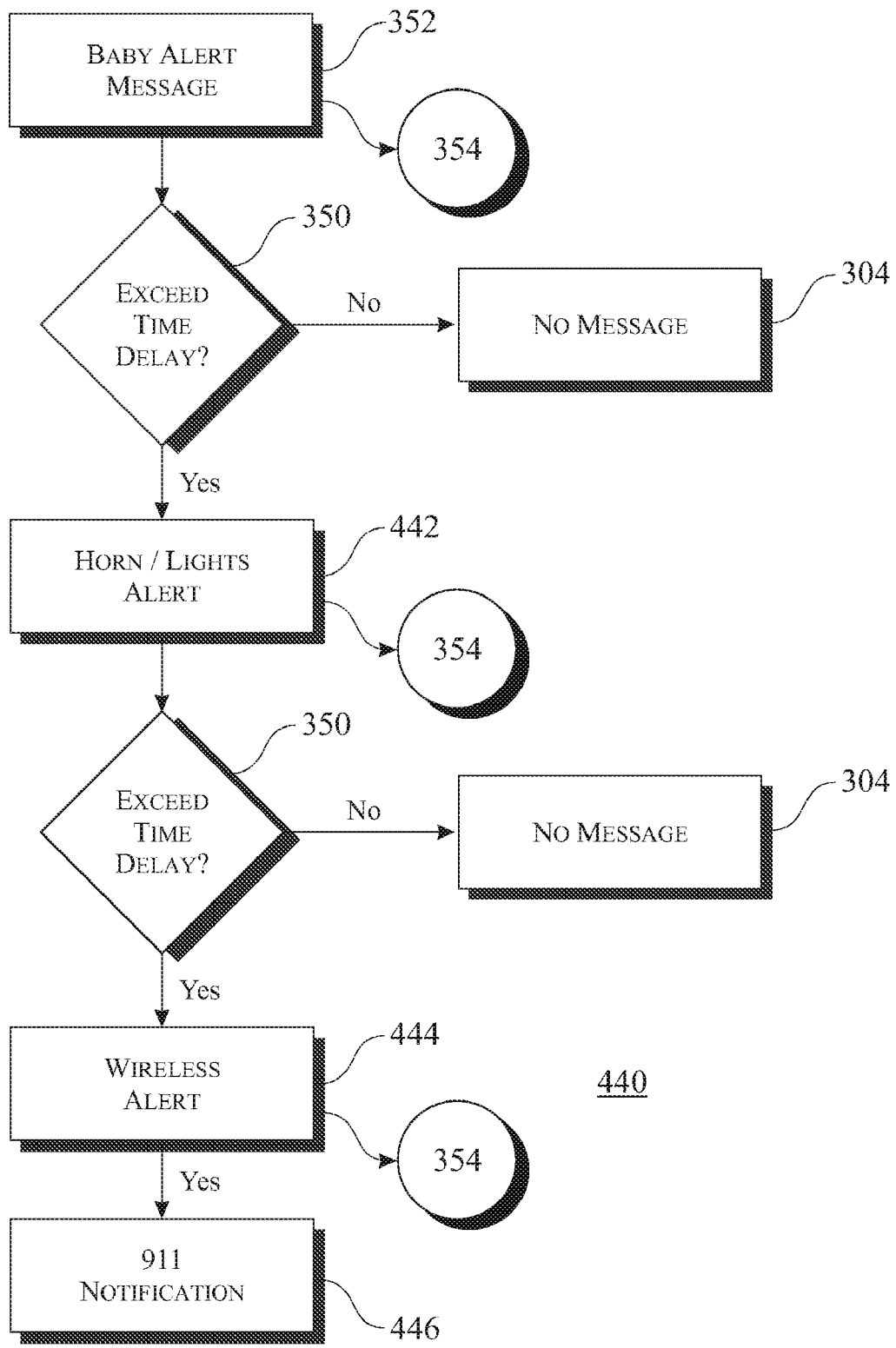
FIG. 27 presents an OEM integrated notification feature of the child seat monitoring system flow diagram.

FIG. 27 presents an OEM integrated baby message alert flow diagram 440, which initiates with the baby on board alert message step 352. The preferred flow would be the baby being removed from the vehicle 354. Until the baby is removed 354, the system continues to monitor the presence of a baby in the car seat 200 beyond an acceptable time span in accordance with a time delay monitoring step 350. Until the time exceeds the predetermined allowable time span, the system proceeds with no message 304. Once the time delay monitoring step 350 determines the baby alert has been active for a time exceeding the predetermined allowable time span and the presence of a baby in the car seat 200 continues, the alert process escalates with a vehicles horn and lights alert activation step 442. The preferred flow would again, have the baby being removed from the vehicle 354. Until the baby is removed 354, the system continues to monitor the presence of a baby in the car seat 200 beyond an acceptable time span in accordance with a time delay monitoring step 350. Until the time exceeds the predetermined allowable time span, the system proceeds with no message 304. Once the time delay monitoring step 350 determines the baby alert has been active for a time exceeding the predetermined allowable time span and the presence of a baby in the car seat 200 continues, the alert process escalates by activating the vehicles horn and lights. Once the time delay monitoring step 350 determines the horn and lights alert has been active for a time exceeding the predetermined allowable time span and the presence of a baby in the car seat 200 continues, the alert process escalates further with a wireless alert activation step 444. The wireless alert can utilize a paging alert, a voice or text message to a cell phone, and the like. The wireless alert would be directed towards a device associated with the key chain or driver. Again, passing through another time monitoring cycle, the process continues to escalates to a 911 notification step 446. The 911 notification step 446 could include a GPS location or other information to aid in identifying the vehicle for the emergency personal.

The Applicant has disclosed a method and apparatus, with several options, for creating and using said locating apparatus. Although the apparatus and methods taught herein are the preferred and alternate embodiments, it can be recognized that other form factors, materials, and methods of achieving the same results can be contrived from the disclosed teachings.

What is claimed is:

1. A child attendant warning system, said child attendant warning system comprising:
   a child detection apparatus, wherein said child detection apparatus identifies when a child is positioned in a child safety seat;
   a power source for operating said child attendant warning system;
   a driver's seat belt monitoring sensor which indicates when the driver's seat belt is engaged and disengaged, and
   at least one of a circuit and a microprocessor containing detection logic, wherein said at least one of a circuit and logic detects when said driver's seat belt monitoring sensor indicates the driver's seat belt is disengaged and when said child detection apparatus detects a child, said child attendant warning system provides a notification.

2. The child attendant warning system of claim 1, wherein said notification is a calm audio output.

3. The child attendant warning system of claim 2, wherein said notification further comprising at least one of an interior/exterior light control and a remote notification apparatus.

4. The child attendant warning system of claim 1, wherein said notification is via an interior/exterior light control.

5. The child attendant warning system of claim 1, wherein said notification is via remote notification.

6. The child attendant warning system of claim 5, wherein said remote notification is at least one of a text message, a page, and a voice message.

7. The child attendant warning system of claim 1, wherein said child detection apparatus is at least one of a pressure sensitive pad and a child safety seat belt status detection sensor.

8. The child attendant warning system of claim 1, wherein said child detection apparatus is adaptable to monitor a plurality of child safety seats.

9. The child attendant warning system of claim 1, the system further comprising a driver's seat belt sensing cable having a connector for mating to a factory installed connector wherein the factory installed connector is in signal communication with a factory installed driver's seat belt monitoring sensor.

10. The child attendant warning system of claim 1, wherein the driver's seat belt monitoring sensor is an aftermarket sensor which is secured to at least one of a driver's seat belt latch plate assembly and a driver's seat belt buckle assembly.

11. A child attendant warning system, said child attendant warning system comprising:
    a child detection apparatus, wherein said child detection apparatus identifies when a child is positioned in a child safety seat;
    a power source for operating said child attendant warning system;
    a driver's seat belt monitoring sensor which indicates when the driver's seat belt is engaged and disengaged, and
    at least one of a circuit and a microprocessor containing detection logic, wherein said at least one of a circuit and logic detects when said driver's seat belt monitoring sensor indicates the driver's seat belt is disengaged and when said child detection apparatus detects a child, said child attendant warning system provides a notification via a calm audio output.

12. The child attendant warning system of claim 11, wherein said driver's presence monitoring sensor identifies at least one of the state of an ignition switch and a person sitting on a driver's seat.

13. The child attendant warning system of claim 11, wherein said notification further comprising at least one of an interior/exterior light control and a remote notification apparatus.

14. The child attendant warning system of claim 11, further comprising an audio file storage medium.

15. The child attendant warning system of claim 11, further comprising at least one of an audio file storage transfer and an audio file recorder.

16. A child attendant warning system, said child attendant warning system comprising:
    a child detection apparatus, wherein said child detection apparatus identifies when a child is positioned in a child safety seat;
    a power source for operating said child attendant warning system;
    a driver's seat belt monitoring sensor which indicates when the driver's seat belt is engaged and disengaged,
    at least one of a circuit and a microprocessor containing detection logic, wherein said at least one of a circuit and logic detects when said driver's seat belt monitoring sensor indicates the driver's seat belt is disengaged and when said child detection apparatus detects a child, said child attendant warning system provides a notification, and
    wherein said notification includes a calm audio output and a external notification.

17. The child attendant warning system of claim 16, wherein said external notification comprising a notification selected from a group consisting of:
    at least one of an interior/exterior light control and
    a remote notification apparatus.

18. The child attendant warning system of claim 16, further comprising an audio file storage medium.

19. The child attendant warning system of claim 16, further comprising at least one of an audio file storage transfer and an audio file recorder.

20. The child attendant warning system of claim 16, wherein said external notification is via a remote notification.

21. The child attendant warning system of claim 20, wherein said remote notification is at least one of a text message, a page, and a voice message.

22. The child attendant warning system of claim 16, wherein said child detection apparatus is at least one of a pressure sensitive pad and a child safety seat belt status detection sensor.

* * * * *